(12) United States Patent
Ukai et al.

(10) Patent No.: US 11,554,430 B2
(45) Date of Patent: Jan. 17, 2023

(54) RECIPROCATING TOOL

(71) Applicant: MAKITA CORPORATION, Anjo (JP)

(72) Inventors: Tomohiro Ukai, Anjo (JP); Yuta Yamashita, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/494,581

(22) Filed: Oct. 5, 2021

(65) Prior Publication Data

US 2022/0134452 A1 May 5, 2022

(30) Foreign Application Priority Data

Nov. 4, 2020 (JP) .............................. JP2020-184429

(51) Int. Cl.
*B23D 51/10* (2006.01)
*B23D 49/16* (2006.01)
*B23D 51/16* (2006.01)

(52) U.S. Cl.
CPC ........... *B23D 51/10* (2013.01); *B23D 49/165* (2013.01); *B23D 51/16* (2013.01)

(58) Field of Classification Search
CPC ...... B23D 51/10; B23D 51/16; B23D 49/165; B23D 51/00; B23D 46/16; B23D 51/02; B23D 49/162; F16F 15/28; Y10T 74/18032; Y10S 30/01
USPC ............... 30/392–294, 277.4, 228, 216, 500; 83/776–780; 74/25, 44, 49
See application file for complete search history.

(56) References Cited

U.S. PATENT DOCUMENTS

| 5,555,626 | A | * | 9/1996 | Fuchs | ..................... | F16H 23/06 30/392 |
| 2008/0184569 | A1 | * | 8/2008 | Moreno | ................. | B23D 51/16 30/392 |
| 2010/0126027 | A1 | * | 5/2010 | Oberheim | .............. | B23D 51/00 30/277.4 |
| 2014/0259701 | A1 | * | 9/2014 | Oberheim | .............. | B23D 51/16 30/392 |

FOREIGN PATENT DOCUMENTS

JP 2015-085429 A 5/2015

* cited by examiner

*Primary Examiner* — Ghassem Alie
(74) *Attorney, Agent, or Firm* — Oliff PLC

(57) ABSTRACT

A reciprocating tool includes a housing, a support body, a slider, a motor, a driving mechanism, a first biasing member, a manipulation member and a first change mechanism. The housing has a first axis that defines a front-rear direction of the reciprocating tool. The support body is supported within the housing. The slider is supported by the support body to be linearly movable. The driving mechanism is operably coupled to the slider and configured to reciprocally move the slider relative to the support body using power of the motor. The first change mechanism is operably coupled to the manipulation member and configured to selectively enable and disable the first biasing member to bias the slider in response to manipulation of the manipulation member. When biasing of the slider by the first biasing member is enabled by the first change mechanism, the first biasing member biases the slider downward.

24 Claims, 19 Drawing Sheets

RECIPROCATING TOOL

CROSS-REFERENCE TO RELATED APPLICATION

The present application claims priority to Japanese patent application No. 2020-184429 filed on Nov. 4, 2020, the contents of which are hereby fully incorporated herein by reference.

TECHNICAL FIELD

The present disclosure relates to a reciprocating tool that is configured to reciprocate a blade.

BACKGROUND

Known reciprocating tools are configured to reciprocate a blade using power of a motor. For example, Japanese laid-open patent publication No. 2015-085429 discloses a reciprocating saw having a vibration-isolating structure.

SUMMARY

The above-described reciprocating saw reduces transmission of vibration from an inner housing to an outer housing, so that the reciprocating saw offers improved comfort in use. However, there is still room for improving the usability of the reciprocating saw under various operation conditions.

Accordingly, it is one, non-limiting object of the present disclosure to provide techniques for improving usability of a reciprocating tool.

In a first, non-limiting aspect of the present disclosure, a reciprocating tool includes a housing, a support body, a slider, a motor, a driving mechanism, a first biasing member, a manipulation member (manually operable member) and a first change mechanism.

The housing has a first axis that defines a front-rear direction of the reciprocating tool. The support body is supported within the housing. The slider is supported by the support body to be linearly movable (e.g., slidable). The slider has a front end portion that is configured to removably receive a blade, which has a cutting edge. The driving mechanism is operably coupled to the slider. The driving mechanism is configured to reciprocally move the slider relative to the support body using power of the motor. The first biasing member is configured to selectively bias the slider. The first change mechanism is operably coupled to the manipulation member. The first change member is configured to selectively enable and disable (allow and prohibit) the first biasing member to bias the slider in response to manipulation of the manipulation member. In an up-down direction that is orthogonal to the first axis, a direction to which the cutting edge of the blade is directed (faces) in normal use of the reciprocating tool defines a downward direction. When biasing of the slider by the first biasing member is enabled (allowed) by the first change mechanism, the first biasing member biases the slider downward. In the present aspect, the slider may be biased directly or indirectly (i.e., via another member) by the first biasing member.

According to the reciprocating tool of the present aspect, by manipulating the manipulation member, a user can change the state of the first biasing member via the first change mechanism. Specifically, the state of the first biasing member can be changed between a first state in which the first biasing member biases the slider (hereinafter simply referred to as a biasing state) and a second state in which the first biasing member does not bias the slider (hereinafter simply referred to as a non-biasing state). Thus, the user can set (place) the first biasing member in an appropriate state by manipulating the manipulation member, depending on an actual condition of a cutting operation (for example, a type of a workpiece). Consequently, usability of the reciprocating tool can be improved.

In a second, non-limiting aspect of the present disclosure, a reciprocating tool includes a housing, a support body, a slider, a motor, a driving mechanism, a first biasing member, a manipulation member and a first change mechanism.

The housing has a first axis that defines a front-rear direction of the reciprocating tool. The support body has a second axis. The support body generally (or at least substantially) extends in the front-rear direction and is supported within the housing. The support body is configured to oscillate (pivot, rock) relative to the housing in an up-down direction that is orthogonal to the first axis. The slider is supported by the support body to be linearly movable (e.g., slidable) along the second axis. The slider is an elongate member, and has a front end portion that is configured to removably receive a blade, which has a cutting edge. The driving mechanism is operably coupled to the slider. The driving mechanism is configured to reciprocally move the slider relative to the support body along the second axis using power of the motor.

The first biasing member is configured to selectively bias the support body. The first change mechanism is operably coupled to the manipulation member. The first change mechanism is configured to selectively enable and disable the first biasing member to bias the support body in response to manipulation of the manipulation member. In an up-down direction that is orthogonal to the first axis, a direction to which the cutting edge of the blade is directed in normal use of the reciprocating tool defines a downward direction. When biasing of the support body by the first biasing member is enabled by the first change mechanism, the first biasing member biases the support body in a first direction in which a front end portion of the support body oscillates (pivots, rocks, moves) downward. In the present aspect, the support body may be biased directly or indirectly (i.e., via another member) by the first biasing member.

According to the reciprocating tool of the present aspect, by manipulating the manipulation member, a user can change the state of the first biasing member via the first change mechanism. Specifically, the state of the first biasing member can be changed between a first state in which the first biasing member biases the support body (hereinafter simply referred to as a biasing state) and a second state in which the biasing member does not bias the support body (hereinafter simply referred to as a non-biasing state). Thus, the user can set (place) the first biasing member in an appropriate state by manipulating the manipulation member, depending on an actual condition of an operation (for example, a type of a workpiece). Consequently, usability of the reciprocating tool can be improved.

DETAILED DESCRIPTION OF THE EMBODIMENTS

Figure 1:
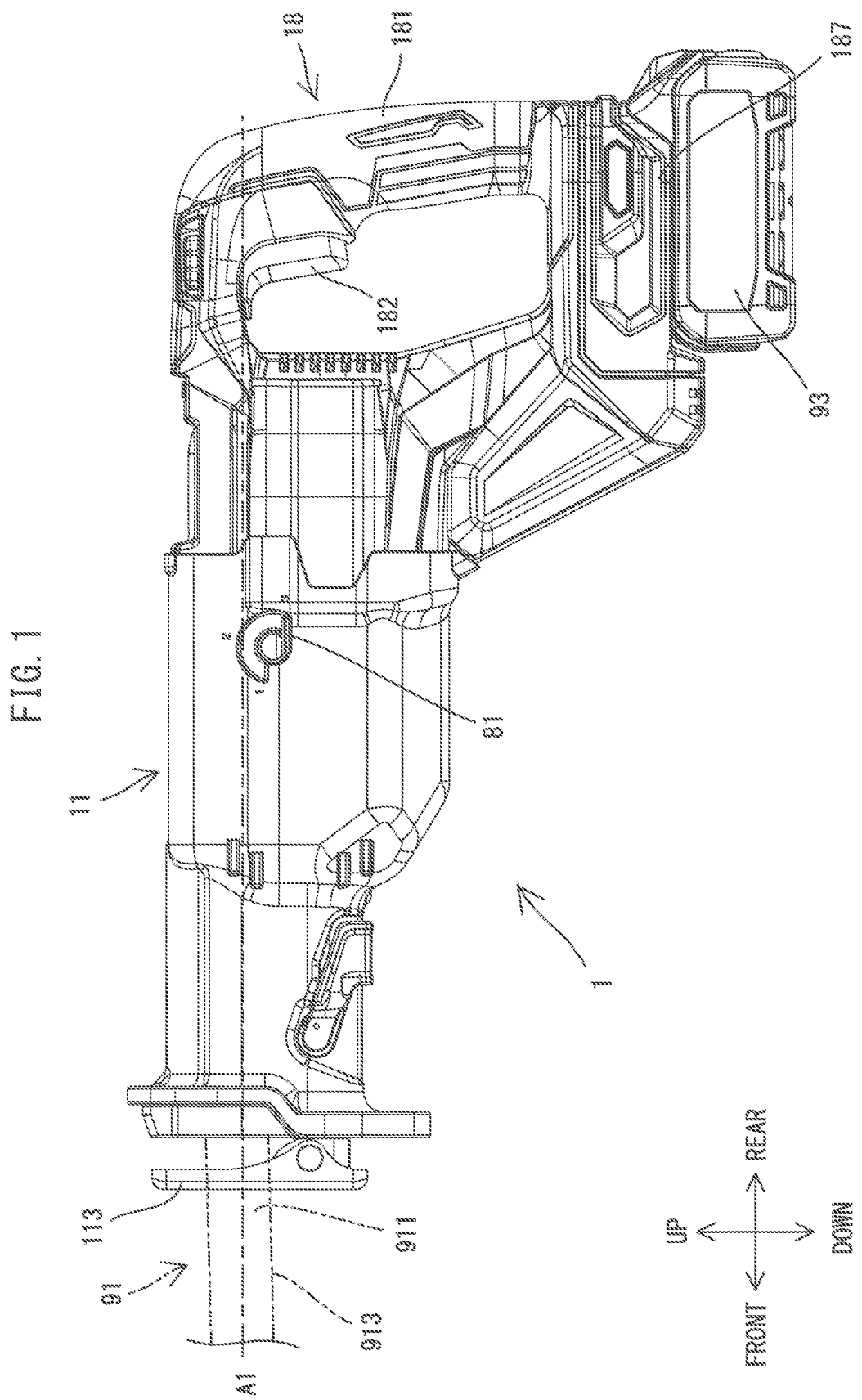
FIG. 1 is a left side view of a reciprocating saw.

In one non-limiting embodiment according to the above-described first and second aspects of the present disclosure, the reciprocating tool may further include a blocking member that is configured to selectively block (interrupt) a biasing force of the first biasing member. The first change mechanism may be configured to cause the blocking member to selectively block (interrupt) the biasing force in response to the manipulation of the manipulation member. According to this embodiment, the biasing state and the non-biasing state can be easily changed using the blocking member.

In addition or in the alternative to the preceding embodiment, the first change mechanism may include a movable member. The movable member may be configured to move in response to the manipulation of the manipulation member, so as to selectively move the blocking member to a blocking position where the blocking member blocks (interrupts) the biasing force. According to this embodiment, the biasing force can be easily blocked (interrupted) by simply moving the blocking member to the blocking position.

In addition or in the alternative to the preceding embodiments, the movable member may be a shaft that is operably coupled to the manipulation member and that is pivotable in response to the manipulation of the manipulation member. The shaft may include a cam part that is configured to selectively abut (comes into contact with) the blocking member in response to pivoting of the shaft, so as to move the blocking member to the blocking position. According to this embodiment, the blocking member can be moved using a simple structure, that is, the shaft having the cam part.

In addition or in the alternative to the preceding embodiments, the reciprocating tool may further comprise an orbital mechanism and a second change mechanism. The orbital mechanism may be configured to selectively generate (cause, impart) an orbital motion of the blade by causing the slider to oscillate (pivot, rock) in the up-down direction while the driving mechanism reciprocally moves the slider. The orbital motion may typically refer to motion along an elliptical orbital path. The second change mechanism may be operably coupled to the manipulation member and configured to selectively change action of the orbital mechanism in response to the manipulation of the manipulation member. Here, the expression "change action of the orbital mechanism" is intended to include, for example, (i) to deactivate the orbital mechanism and (ii) to change an amount by which the slider is oscillated (pivoted, rocked) by the orbital mechanism (i.e., to change the orbital path of the blade).

According to this embodiment, by manipulating the manipulation member, the user can change the action of the orbital mechanism via the second change mechanism. The user can set (select) the appropriate action of the orbital mechanism by manipulating the manipulation member, depending on the actual condition of the cutting operation (for example, a type of a workpiece). Further, the single (same, common) manipulation member can change both the state of the first change mechanism and the state of the second change mechanism. Thus, operability can be improved without an increase or with only a limited increase in the parts count.

In addition or in the alternative to the preceding embodiments, the first change mechanism and the second change mechanism may include a common shaft that is operably coupled to the manipulation member and that is pivotable in response to the manipulation of the manipulation member. The first change mechanism may include a first change part that is disposed on the common shaft and that is configured to selectively enable and disable (allow and prohibit) the biasing by the first biasing member in response to pivoting of the common shaft. The second change mechanism may include a second change part that is disposed on the common shaft and that is configured to selectively change the action of the orbital mechanism in response to the pivoting of the common shaft. According to this embodiment, both the state of the first biasing member and the state of the orbital mechanism can be changed using a simple structure, that is, the single common shaft and the first change part and the second change part that are disposed on the shaft.

In addition or in the alternative to the preceding embodiments, the manipulation member may be pivotable between at least a first pivot position, a second pivot position and a third pivot position. The first change part may be configured (i) to enable (allow) the biasing by the biasing member when the manipulation member is at (in) the first pivot position, (ii) to disable (prohibit) the biasing by the biasing member when the manipulation member is at (in) the second pivot position, and (iii) to disable (prohibit) the biasing by the biasing member when the manipulation member is at (in) the third pivot position. The second change part may be configured to change the action of the orbital mechanism such that at least the action of the orbital mechanism when the manipulation member is at (in) the second pivot position is different from the action of the orbital mechanism when the manipulation member is at (in) the third pivot position. According to this embodiment, by simply manually pivoting the manipulation member, the user can select an appropriate combination among at least three combinations of the state of the first biasing member and the state of the orbital mechanism, depending on the actual condition of the cutting operation.

In addition or in the alternative to the preceding embodiments, the reciprocating tool may further comprise a blocking member that is disposed between the support body and the first biasing member. The first change part may be configured as a first cam part. The second change part may be configured as a second cam part. The driving mechanism may include a crank plate. The crank plate may be disposed below a rear end portion of the support body. The crank plate may be configured to be rotationally driven around a rotational axis extending in the up-down direction by the power of the motor. The crank plate may have a crank pin. The crank pin may be fixed at a position eccentric to (offset from) the rotational axis and may be operably coupled to the slider. The orbital mechanism may include a third cam part and a second biasing member. The third cam part may be configured as an annular protrusion that is disposed on the crank plate and that protrudes upward from an upper surface of the crank plate such that the thickness of the third cam part in the up-down direction varies along a circumferential direction around the rotational axis. The second biasing member may be configured to bias the rear end portion of the support body in a direction in which the rear end portion of the support body abuts on the third cam part. The first cam part may be configured to release the blocking member from a blocking position where the blocking member blocks (interrupts) the biasing force of the first biasing member when the manipulation member is at (in) the first pivot position. The first cam part may also be configured to abut (come into contact with) the blocking member so as to hold the blocking member at (in) the blocking position both when the manipulation member is at (in) the second pivot position and when the manipulation member is at (in) the third pivot position. The second cam part may be configured to abut (come into contact with) the support body in at least a portion of a process in which the crank plate makes one rotation (a 360-degree turn) so as to prevent (block) the rear end portion of the support body from abutting on (coming into contact with) the third cam part when the manipulation member is at (in) the second pivot position. Further, the second cam part may be configured to allow the rear end portion of the support body to abut (come into contact with) the third cam part in the entirety of the process in which the crank plate makes one rotation when the manipulation member is at (in) the third pivot position. According to this embodiment, a rational mechanism that utilizes the crank plate can generate the orbital motion of the blade while reciprocally moving the slider. Further, both the state of the first biasing member and the state of the orbital mechanism can be changed by a simple structure, that is, the single shaft and the first cam part and the second cam part that are disposed on the shaft. In this embodiment, when the manipulation member is at (in) the third pivot position, a larger orbital motion of the blade can be achieved, compared to when the manipulation member is at (in) the second pivot position.

In addition or in the alternative to the preceding embodiments, the support body may be configured to oscillate (pivot, rock) relative to the housing around an axis extending in a left-right direction, which is orthogonal to both of the front-rear direction and the up-down direction. According to this embodiment, a rational support structure for the support body can be realized.

In addition or in the alternative to the preceding embodiments, the reciprocating tool may further include an abutment part that is configured to abut (come into contact with) the support body or the slider so as to define (limit) an amount by which the slider moves in a second direction that is opposite to a biasing direction of the first biasing member. According to this embodiment, when the user presses the blade against a workpiece and the first biasing member is deformed to some extent, the abutment part can prevent (block) the slider from further moving in the second direction. Thus, the pressing force applied by the user can be efficiently transmitted to the workpiece.

In addition or in the alternative to the preceding embodiments, the first biasing member may be a compression coil spring that is disposed between the support body and the housing in the up-down direction. According to this embodiment, the first biasing member having a simple structure can be realized.

In addition or in the alternative to the preceding embodiments, the reciprocating tool may further include a blocking member that is disposed between the support body and the compression coil spring to be movable in the up-down direction. The first change mechanism may be configured to selectively hold the blocking member at a blocking position where the blocking member is spaced apart from the support body and to allow the blocking member to abut (come into contact with) the support body, in response to the manipulation of the manipulation member. The compression coil spring may be configured to bias the support body via the blocking member when the blocking member is allowed to abut the support body. According to this embodiment, a relatively simple and rational structure for changing the state of the biasing member can be realized by utilizing the compression coil spring and the blocking member.

In addition or in the alternative to the preceding embodiments, the compression coil spring and the blocking member may be supported by a common support member extending in the up-down direction. According to this embodiment, a compact and simple support structure can be realized for the compression coil spring and the blocking member.

Figure 2:
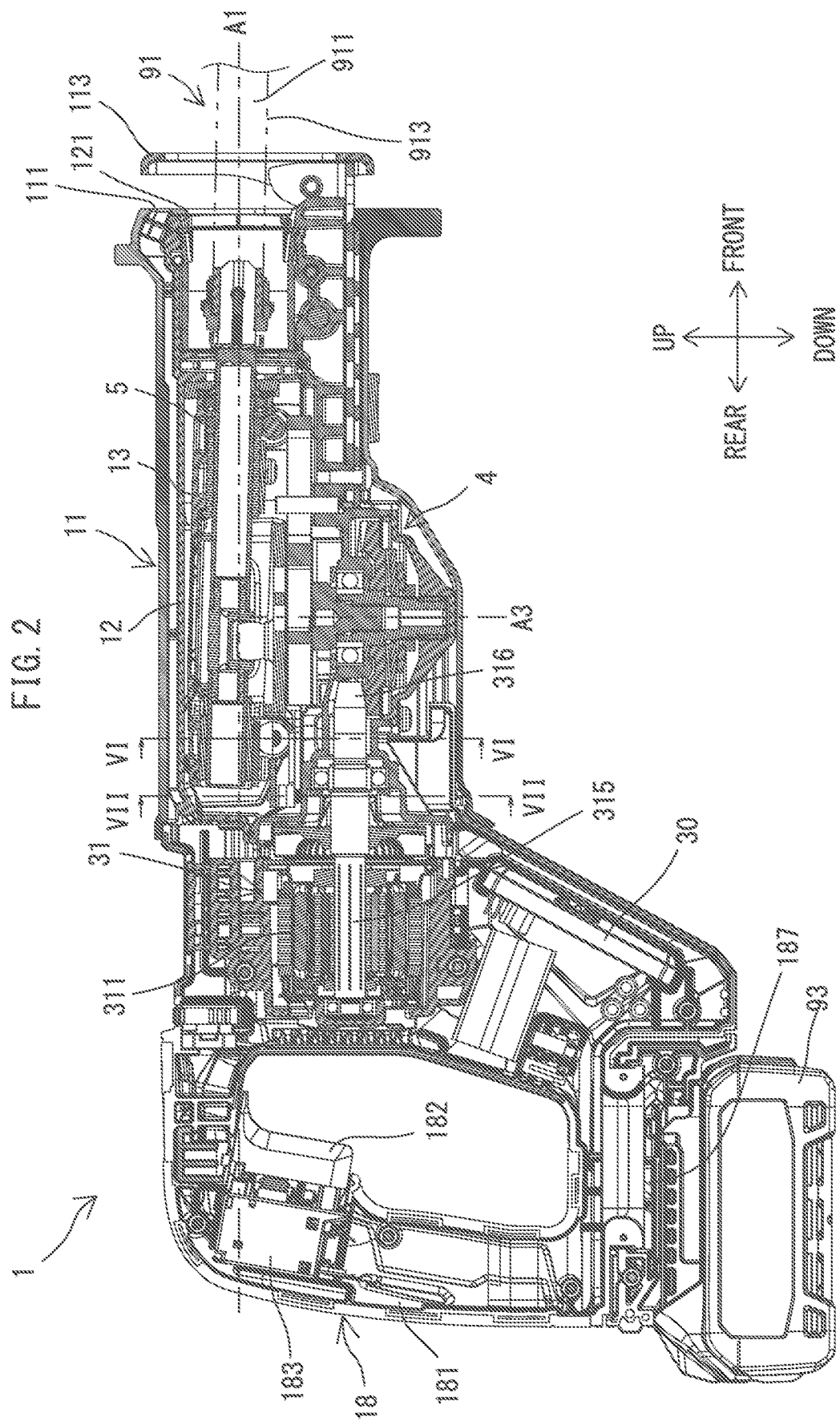
FIG. 2 is a sectional view of the reciprocating saw, wherein a slider is at a first slider position in a third action mode.

A reciprocating saw (also called a recipro saw or a saber saw) 1 according to a non-limiting, detailed embodiment of the present disclosure is now described with reference to the drawings. The reciprocating saw 1 shown in FIGS. 1 and 2 is an example of a portable reciprocating tool. The reciprocating saw 1 is configured to cut a workpiece (e.g., wood, plastic material, steel etc.) by reciprocating a thin plate-like blade 91 that is removably coupled (mounted, attached) thereto.

First, the general structure of the reciprocating saw 1 is described.

As shown in FIGS. 1 and 2, an outer shell of the reciprocating saw 1 is mainly formed by a body housing 11 and a handle 18.

The body housing 11 is an elongate hollow body. The body housing 11 has a longitudinal axis A1. The body housing 11 houses a motor 31, a slider 5 to which a blade 91 can be coupled (mounted, attached), a driving mechanism 4 that is configured to reciprocate the blade 91 using the power of the motor 31, and other components. An opening 111 is formed in one end portion of the body housing 11 in an extension direction of the longitudinal axis A1 (also simply referred to as the longitudinal direction of the body housing 11). The longitudinal axis A1 intersects (extends through)

the opening 111. The blade 91, when coupled to the slider 5, extends outward of the body housing 11 through the opening 111. A shoe 113, which is configured to abut on a workpiece during a cutting operation, is detachably mounted to the body housing 11 in the vicinity of the opening 111.

The handle 18 is a generally C-shaped hollow body. The handle 18 is connected to the other end portion of the body housing 11 in its longitudinal direction so as to form a loop shape together with a rear end portion of the body housing 11. The handle 18 includes a grip portion 181 to be gripped by a user. The grip portion 181 extends in a direction that intersects (specifically, generally orthogonally intersects) the longitudinal axis A1 of the body housing 11. A trigger 182 for activating (actuating) the motor 31 is disposed on the grip portion 181. The grip portion 181 houses a switch 183. A battery housing 187 is mounted on the handle 18. A rechargeable battery 93 (also referred to as a battery pack or battery cartridge), which is a power source for the reciprocating saw 1, is removably coupled to the battery housing 187. Although not shown and described in detail, the battery housing 187 is a separate (discrete) member from the handle 18, and is coupled to the handle 18 via an elastic body. However, instead of the battery housing 187, a battery-mount part, to which the battery 93 can be removably coupled, may be provided (e.g., integrally formed) in or at a lower end portion of the handle 18. Further, the handle 18 houses a controller 30.

When the user depresses the trigger 182, the switch 183 is turned ON and the motor 31 is energized, so that the blade 91 is reciprocally moved in the longitudinal direction of the body housing 11 by the driving mechanism 4.

The structure of the reciprocating saw 1 is now described in greater detail. In the following description, for the sake of convenience, the extension direction of the longitudinal axis A1 of the body housing 11 is defined as a front-rear direction of the reciprocating saw 1. In the front-rear direction, the side on which the opening 111 is located is defined as the front side, and the opposite side (the side on which the handle 18 is located) is defined as the rear side. The direction that is orthogonal to the longitudinal axis A1 and that is at least substantially parallel to a plate surface (flat surface) 911 of the blade 91 coupled to the slider 5 (or, a direction that is orthogonal to the longitudinal axis A1 and that generally corresponds to the extension direction of the grip portion 181) is defined as an up-down direction of the reciprocating saw 1. In the up-down direction, a direction to which a cutting edge 913 of the blade 91 in normal use is directed (faces) is defined as the downward direction, and the opposite direction thereof is defined as the upward direction. A direction that is orthogonal to the front-rear direction and the up-down direction is defined as the left-right direction of the reciprocating saw 1.

First, elements/components within the body housing 11 will be described in greater detail.

As shown in FIG. 2, the body housing 11 mainly houses the motor 31, the driving mechanism 4, a support body 13 and the slider 5.

The motor 31 is disposed in a rear end portion of the body housing 11. The motor 31 of the present embodiment is a brushless DC motor. The motor 31 has a body part 311, which includes a stator and a rotor, and a motor shaft (rotary shaft) 315, which is rotatable integrally with the rotor. The motor 31 is arranged such that the rotational axis of the motor shaft 315 extends in parallel to the longitudinal axis A1 of the body housing 11 (i.e., in the front-rear direction). A pinion gear 316 is formed or provided on a front end portion of the motor shaft 315. The pinion gear 316 is a bevel gear. The pinion gear 316 is formed integrally with the motor shaft 315 to rotate together with the motor shaft 315 around the rotational axis.

In the present embodiment, the controller 30 is configured to control driving of the motor 31. Although not shown in detail, the controller 30 has a microcomputer including a CPU, a ROM, a RAM and the like. When the switch 183 is turned ON, the controller 30 causes the motor 31 to be driven.

In the present embodiment, the driving mechanism 4 and the slider 5 are disposed frontward of the motor 31 within the body housing 11. More specifically, the driving mechanism 4 and the slider 5 are housed in a gear housing 12. The gear housing 12 is fixedly held within the body housing 11. Thus, the gear housing 12 and the body housing 11 may be collectively regarded as a single housing. The gear housing 12 is generally an elongate hollow body and has an opening 121 at its front end. The slider 5 is supported by the support body 13 in the gear housing 12. The blade 91, when coupled to the slider 5, extends outward of the gear housing 12 through the opening 121.

The driving mechanism 4 is now described. The driving mechanism 4 is configured to transmit rotation of the motor shaft 315 to the slider 5 to drive the slider 5.

Figure 3:
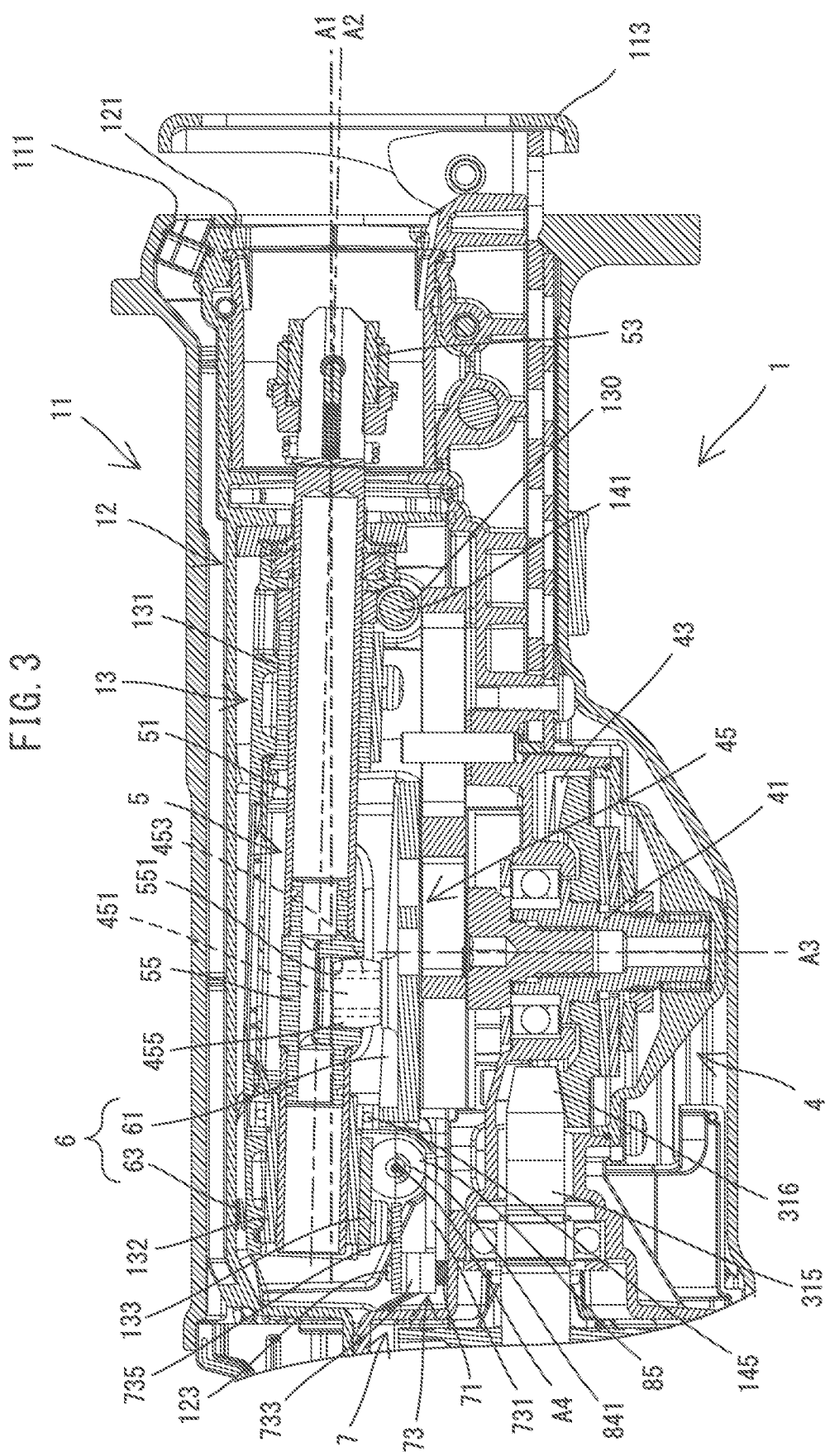
FIG. 3 is a partial, enlarged view of FIG. 2.

As shown in FIG. 3, the driving mechanism 4 includes an intermediate shaft 41, a bevel gear 43 and a crank plate 45.

The intermediate shaft 41 is arranged in front of the front end portion of the motor shaft 315 in a lower end portion of the body housing 11 (the gear housing 12). The intermediate shaft 41 is rotatably supported by two bearings. The rotational axis A3 of the intermediate shaft 41 extends in the up-down direction.

The bevel gear 43 is coaxially fixed to the intermediate shaft 41 and is rotatable integrally with the intermediate shaft 41 around the rotational axis A3 of the intermediate shaft 41. The bevel gear 43 is disposed below the motor shaft 315 and meshes with the pinion gear 316. Thus, the bevel gear 43 rotates together with the intermediate shaft 41 in response to driving of the motor 31.

The crank plate 45 is a circular plate member in plan view. The crank plate 45 is arranged coaxially with the intermediate shaft 41 and fixed to an upper portion of the intermediate shaft 41. Thus, the crank plate 45 rotates integrally with the intermediate shaft 41 around the rotational axis A3.

The crank plate 45 has a crank pin (sliding pin) 451. The crank pin 451 is fixed to the crank plate 45 at a position eccentric to (offset from) the rotational axis A3 of the crank plate 45, and protrudes upward from the upper surface of the crank plate 45. A hollow, generally cylindrical connection member 455 is disposed around the crank pin 451. A bearing 453 (specifically, a needle bearing) is disposed between the crank pin 451 and the connection member 455 in the radial direction of the crank pin 451. Thus, the connection member 455 is rotatable around the axis of the crank pin 451 relative to the crank pin 451. An outer peripheral surface of the connection member 455 is not a simple cylindrical surface, but formed as a curved surface that is curved upward and downward.

The support body 13 is now described. The support body 13 is an elongate member and is supported within the gear housing 12 so as to generally (or at least substantially) extend in the front-rear direction. In the present embodiment, the support body 13 includes an upper wall, a left wall and a right wall.

Sliding contact bearings (also referred to as plain bearings) 131, 132 are fixed to a front end portion and a rear end portion of the support body 13, respectively. The sliding contact bearings 131, 132 are arranged coaxially to each other, and a common axis of the sliding contact bearings 131, 132 defines a longitudinal axis of the support body 13. The slider 5 is coaxially inserted through the sliding contact bearings 131, 132. The slider 5 is thus supported by the sliding contact bearings 131, 132 to be slidable along the longitudinal axis of the support body 13. Thus, the longitudinal axis (the common axis of the sliding contact bearings 131, 132) of the support body 13 defines the driving axis A2 of the slider 5.

Further, the support body 13 is supported such that the support body 13 is capable of oscillating (pivoting, rocking) in the up-down direction relative to the gear housing 12. More specifically, the support body 13 is coupled to the gear housing 12 via a pin 141. The pin 141 extends in the left-right direction in the gear housing 12 and opposite end portions of the pin 141 are supported by the gear housing 12. The pin 141 is inserted into support holes 130 that are respectively formed in lower front end portions of the left wall and the right wall of the support body 13. Owing to this configuration, the support body 13 can oscillate (pivot, rock) in the up-down direction around the axis of the pin 141 that serves as a pivot.

The slider 5 is now described. As shown in FIG. 3, the slider 5 as a whole is an elongate member that extends linearly. The slider 5 generally (or at least substantially) extends in the front-rear direction within the body housing 11 (the gear housing 12). In the present embodiment, the slider 5 includes a body 51, a blade mount part 53 and a pin connection part 55.

The body 51 is a portion of the slider 5 that is supported by the sliding contact bearings 131, 132 of the support body 13. The body 51 has a hollow cylindrical shape having a substantially uniform diameter. The blade mount part 53 is mounted on a front end portion of the slider 5. A base end portion of the blade can be removably coupled to (received by) the blade mount part 53 (see FIG. 2).

The pin connection part 55 is integrally formed with the body 51, and disposed slightly rearward of the central portion of the body 51 in the front-rear direction. The pin connection part 55 extends in the left-right direction and is thus orthogonal to the longitudinal axis A2 of the body 51 (i.e., to the driving axis A2 of the slider 5). Although not shown in detail, the width in the left-right direction of the pin connection part 55 is larger than the diameter of the body 51. A left end portion and a right end portion of the pin connection part 55 protrude leftward and rightward, respectively, from the body 51. A guide recess 551, which is recessed upward, is formed in a lower portion of the pin connection part 55. The guide recess 551 extends over generally the entire length of the pin connection part 55 in the left-right direction.

The pin connection part 55 is operably coupled to the crank pin 451. More specifically, an upper portion of the crank pin 451, around which the bearing 453 and the connection member 455 are mounted, is inserted into the guide recess 551. The width in the front-rear direction of the guide recess 551 is substantially equal to the maximum diameter of the connection member 455. The length in the left-right direction of the guide recess 551 is slightly larger than the diameter of an orbital path of the crank pin 451 around the rotational axis A3. The connection member 455 has the outer peripheral surface shaped as described above, so that the connection member 455 can smoothly move within the guide recess 551, regardless of the position of slider 5 in the up-down direction.

Owing to this configuration, the crank pin 451 is movable in the left-right direction within the guide recess 551 while forward and rearward movement of the crank pin 451 relative to the guide recess 551 is restricted (blocked). When the crank plate 45 rotates together with the intermediate shaft 41, the crank pin 451 revolves (orbits) around the rotational axis A3 of the crank plate 45. At this time, only the movement components in the front-rear direction of the revolving motion of the crank pin 451 are transmitted to the pin connection part 55, so that the slider 5 is reciprocated (reciprocally moved) generally (or at least substantially) in the front-rear direction along the driving axis A2 relative to the support body 13. In this manner, the crank plate 45 having the crank pin 451, and the pin connection part 55 of the slider 5 serve as a motion converting mechanism that converts the rotation of the motor shaft 315 into the linear reciprocating motion of the slider 5.

The reciprocating saw 1 of the present embodiment has three action modes (a first action mode, a second action mode and a third action mode). The reciprocating saw 1 operates according to the action mode selected by the user from among the first action mode, the second action mode and the third action mode.

In the first action mode, the support body 13 is biased in such a direction that the blade 913 oscillates (pivots, moves) downward (i.e., toward the workpiece), so that the likelihood of bouncing (springing, jumping) of the cutting edge 913 is reduced.

In the second action mode and the third action mode, the slider 5 is oscillated (pivoted, rocked) in the up-down direction while the slider 5 is linearly reciprocated in the front-rear direction, so that the blade 91 is moved along an elliptical orbital path. In the following description, the movement of the blade 91 along the elliptical orbital path is also referred to as orbital motion or orbital action. The difference between the second action mode and the third action mode is in the magnitude of the orbital motion of the blade 91 (i.e., in the shape of the orbital path of the blade 91). Specifically, the third action mode enables (allows) the orbital motion of the blade 91 that is larger than the orbital motion of the blade 91 in the second action mode.

A mechanism that is configured to bias the support body 13 in the direction in which the blade 913 oscillates (pivots, moves) downward (hereinafter referred to as a biasing mechanism 7) is now described. As shown in FIGS. 5 to 8, the biasing mechanism 7 is disposed in a rear end portion of the body housing 11 (the gear housing 12). The biasing mechanism 7 includes two biasing members 71 and an blocking member 73.

Each of the biasing members 71 of the present embodiment is a compression coil spring. The two biasing members 71 are respectively supported by two support pins 123. The support pins 123 are each fixed to the gear housing 12 and protrude upward. The two support pins 123 are disposed below and rearward of a rear end of the support body 13, and spaced apart from each other in the left-right direction. Each of the biasing members 71 is supported by the support pin 123 such that the axis of the coil extends in the up-down direction.

The blocking member 73 is a single metal member that includes left and right first abutment (contact) parts 731, a connection part 733 and a second abutment (contact) part 735. Each of the first abutment parts 731 is a rectangular plate-like portion. The first abutment parts 731 are spaced apart from each other in the left-right direction, and extend in the front-rear direction in parallel to each other. The connection part 733 connects rear end portions of the left and right first abutment parts 731. The connection part 733 is a curved plate-like portion having an inverted U-shape (protruding upward). The second abutment part 735 is a rectangular plate-like portion extending forward from a front end of the connection part 733. A support hole is formed in a rear end portion of each of the first abutment parts 731. The support hole has a diameter that is approximately the same as the diameter of the support pin 123. The blocking member 73 is supported such that the support pins 123 are respectively inserted through the support holes and the first abutment parts 731 are respectively placed on the biasing members 71.

The blocking member 73 is biased upward relative to the gear housing 12 by the biasing force of the biasing members 71. When the first action mode is selected, the second abutment part 735 abuts (contacts) a rear end portion of the support body 13 (specifically, a fixed plate (hereinafter, referred to as a abutment part 133) that covers a lower end portion of the sliding contact bearing 132), as will be described in detail below. On the other hand, when the first action mode is not selected, the first abutment part 731 is pressed from above and held in a specified position while compressing the biasing members 71. At this time, the second abutment part 735 is spaced apart downward from the abutment part 133 of the support body 13. Thus, the biasing members 71 are blocked (prevented) from applying the biasing force to the support body 13.

A mechanism that is configured to generate (cause, bring about) the orbital motion of the blade 91 (hereinafter referred to as an orbital mechanism 6) is now described in detail. The orbital mechanism 6 is configured to oscillate (pivot, rock) the support body 13 in the up-down direction while the slider 5 is reciprocating in the front-rear direction. In the present embodiment, the orbital mechanism 6 includes a cam part 61 and two biasing members 63. It is noted here that the two biasing members 63 are respectively disposed at left and right end portions of the support body 13, but only one of the biasing members 63 is shown in the drawings.

Figure 4:
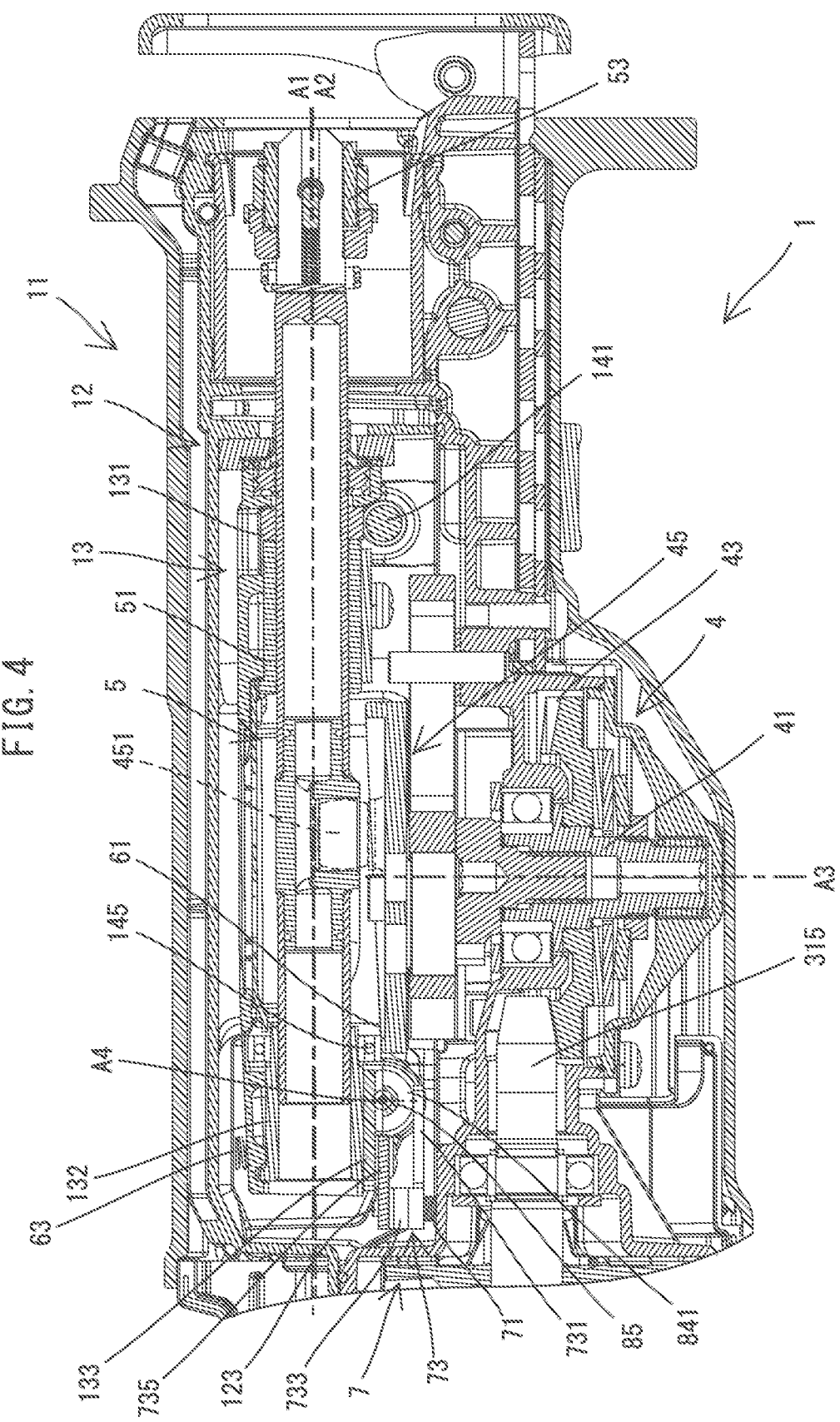
FIG. 4 is a sectional view corresponding to FIG. 3, wherein the slider is at a second slider position.

As shown in FIGS. 3 and 4, the cam part 61 is provided or defined on the crank plate 45 described above. The cam part 61 is an annular portion formed along the outer edge of the crank plate 45 and protrudes upward from the upper surface of the crank plate 45. The amount that the cam part 61 protrudes upward from the upper surface of the crank plate 45 (i.e., the thickness of the cam part 61 in the up-down direction) varies along the circumferential direction of the cam part 61. That is, the cam part 61 has a rising and declining profile. More specifically, as shown in FIG. 3, the cam part 61 is configured such that, when the thickest portion of the cam part 61 is located at its rearmost position, the upper end surface (cam surface) of the cam part 61 slopes downward and forward relative to a virtual plane that is orthogonal to the rotational axis A3 of the intermediate shaft 41. In the following description, the rotational position of the crank plate 45 when the thickest portion of the cam part 61 is at the rearmost position is referred to as the first rotational position. The position of the slider 5 in the front-rear direction when the crank plate 45 is at the first rotational position is referred to as the first slider position. Further, the rotational position of the crank plate 45 when the thinnest portion of the cam part 61 is at its rearmost position is referred to as the second rotational position. The position of the slider 5 in the front-rear direction when the crank plate 45 is at the second rotational position is referred to as the second slider position.

The biasing members 63 are arranged between a lower surface of an upper wall of the gear housing 12 and an upper surface of the upper wall of the support body 13. In the present embodiment, the biasing members 63 are compression coil springs. The biasing members 63 are each compressed between a rear end portion of the gear housing 12 and a rear end portion of the support body 13, so that the biasing members 63 always bias the rear end portion of the support body 13 downward relative to the body housing 11 (the gear housing 12). In other words, the biasing members 63 bias the support body 13 in a direction in which the front end portion of the support body 13 (the blade 91) oscillates (pivots, rocks) upward.

A bearing 145 is fitted around an outer periphery of a front end portion of the rear sliding contact bearing 132 mounted to the support body 13. The bearing 145 is a ball bearing. An inner ring of the bearing 145 is press-fitted around the sliding contact bearing 132. An outer ring of the bearing 145 is rotatable around the driving axis A2 relative to the support body 13. A rear end portion of the crank plate 45 (a portion of the cam part 61) is directly below the bearing 145 in the up-down direction.

As described above, the rear end portion of the support body 13 is biased downward (i.e., in the direction the bearing 145 approaches the cam part 61) by the biasing members 63. Thus, the bearing 145 abuts (contacts) the cam part 61 of the crank plate 45 from above, unless the oscillation (pivoting) of the support body 13 is prohibited (blocked) or unless an external force to oscillate (pivot) the support body 13 in the opposite direction is applied to the support body 13.

When the motor 31 is driven and the crank plate 45 rotates, because the bearing 145 is in contact with the cam part 61, the bearing 145 follows the upper surface (cam surface) of the cam part 61 while rotating. The thickness of the portion of the cam part 61 that is abutting the bearing 145 changes in response to the rotation of the crank plate 45. Accordingly, the bearing 145 moves in the up-down direction as the crank plate 45 rotates.

More specifically, as shown in FIG. 3, when the crank plate 45 is at the first rotational position, the bearing 145 abuts the thickest portion of the cam part 61. At this time, the slider 5 is at the first slider position, and the bearing 145 is at its uppermost position within a range in which the bearing 145 moves upward and downward in contact with the cam part 61. On the other hand, as shown in FIG. 4, when the crank plate 45 is at the second rotational position, the bearing 145 abuts the thinnest portion of the cam part 61. At this time, the slider 5 is at the second slider position, and the bearing 145 is at its lowermost position within the range in which the bearing 145 moves upward and downward in contact with the cam part 61.

Owing to this configuration, the support body 13 oscillates (pivots, rocks) in the up-down direction around the pin 141 (the pivot) relative to the body housing 11 (gear housing 12), in response to the rotation of the crank plate 45 (i.e., in response to the reciprocating movement of the slider 5). The blade 91 is thus driven in the orbital motion, such that the blade 91 oscillates (pivots, rocks) upward while moving forward and oscillates (pivots, rocks) downward while moving rearward.

A mechanism for changing the action mode of the reciprocating saw 1 is now described.

In the present embodiment, the action mode of the reciprocating saw 1 is changed by a change mechanism (mode changeover mechanism) 82 in response to manipulation of a change lever 81 performed by the user. As shown in FIG. 1, the change lever 81 is disposed outside the body housing 11 (specifically, disposed on a left side surface of the body housing 11). As shown in FIGS. 3 and 5 to 7, the change mechanism 82 includes a change shaft 83, a first change part 84 and a second change part 85.

The change shaft 83 is disposed in the rear end portion of the gear housing 12 and extends in the left-right direction. The change shaft 83 is supported by the gear housing 12 with its opposite end portions being inserted into insertion holes respectively formed in left and right walls of the gear housing 12. The change shaft 83 is rotatable (pivotable) around a rotational axis (pivot axis) A4 extending in the left-right direction. The change lever 81 is fixed to a left end portion of the change shaft 83. Thus, when the change lever 81 is manually pivoted by the user, the change shaft 83 is also pivoted.

The change shaft 83 is disposed directly below the abutment part 133 of the support body 13 (specifically, a portion disposed rearward of the bearing 145). Further, the change shaft 83 is disposed directly above the first abutment parts 731 in the up-down direction and in front of the second abutment part 735 of the blocking member 73 of the biasing mechanism 7 in the front-rear direction.

Both of the first change part 84 and the second change part 85 are disposed on the change shaft 83. The state (status) of the first change part 84 is changeable between a first state in which the first change part 84 enables the operation of the biasing mechanism 7 (i.e., allows the biasing mechanism 7 to bias the support body 13) and a second state in which the first change part 84 disables the operation of the biasing mechanism 7 (i.e., blocks (prohibits) the biasing mechanism 7 from biasing the support body 13), depending on (according to) the pivot position of the change shaft 83. The state (status) of the second change part 85 is changeable between a first state in which the second change part 85 completely allows (does not restrict or limit) the operation of the orbital mechanism 6 (i.e., allows the support body 13 to oscillate within its entire oscillation range in the up-down direction) and a second state in which the second change part 85 partially blocks (prevents, restricts, limits) the operation of the orbital mechanism 6 (i.e., allows the support body 13 to oscillate only within a limited range), depending on (according to) the pivot position of the change shaft 83. Thus, in the present embodiment, the state (status) of the biasing mechanism 7 and the state (status) of the orbital mechanism 6 can be changed, using the single (common) change shaft 83.

The first change part 84 is now described in more detail.

Figure 5:
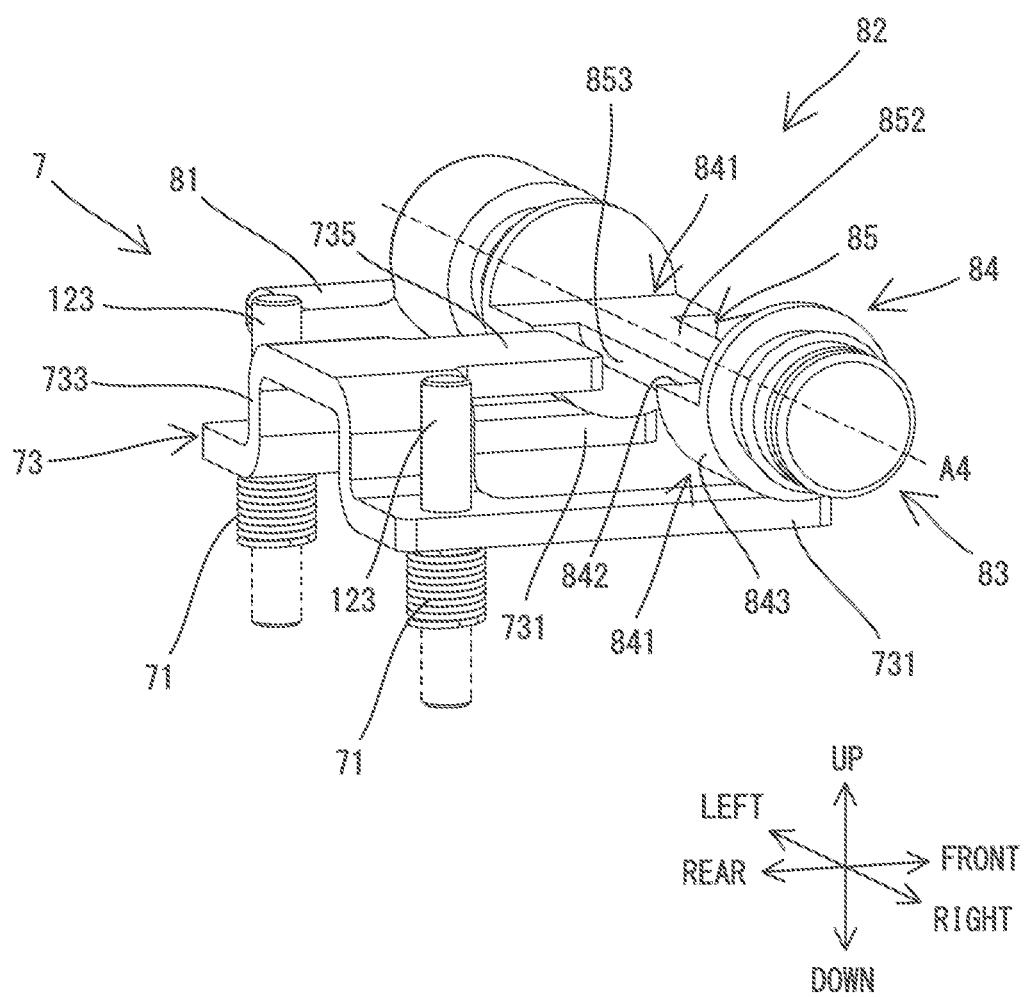
FIG. 5 is a perspective view of a biasing mechanism, a change lever and a change mechanism when the third action mode is selected.
Figure 6:
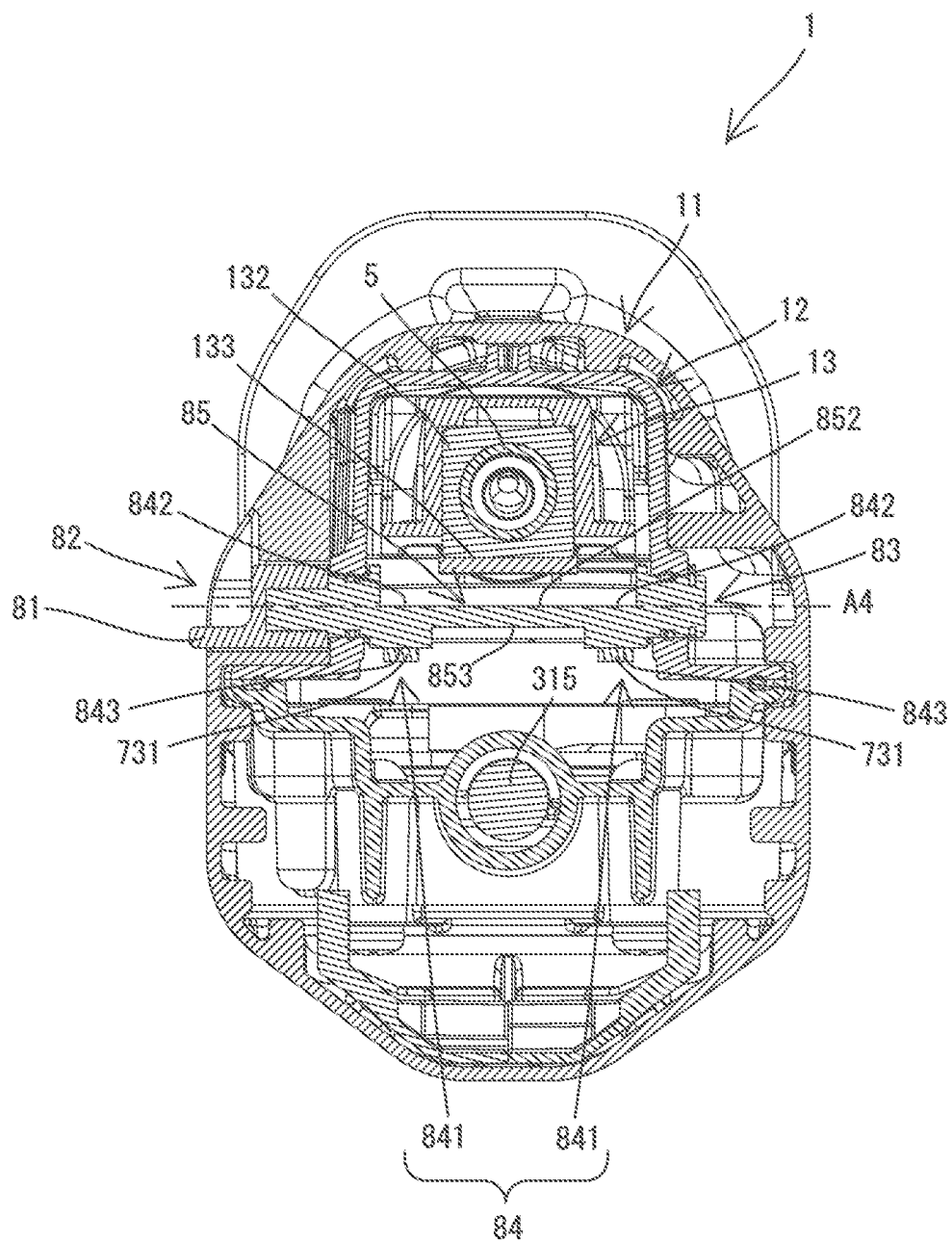
FIG. 6 is a sectional view taken along line VI-VI in FIG. 2.
Figure 7:
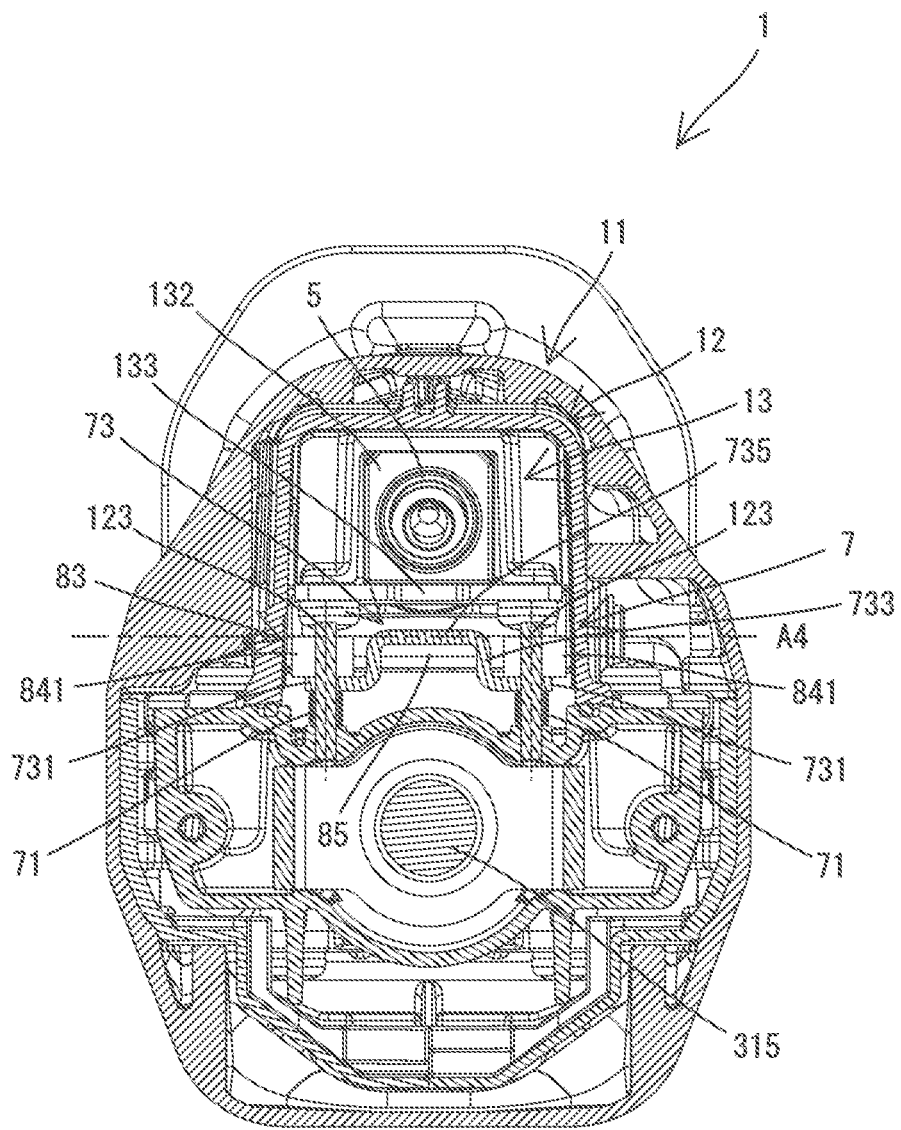
FIG. 7 is a sectional view taken along line VII-VII in FIG. 2.

As shown in FIGS. 3, 5 and 6, the first change part 84 includes left and right cam parts 841. The cam parts 841 are respectively disposed on left and right end portions of the change shaft 83. Each of the cam parts 841 has a substantially semicircular section. An outer surface of each of the cam parts 841 includes a flat surface 842, which contains the rotational axis A4, and an arc-shaped curved surface 843. The left and right cam parts 841 are disposed directly above left and right first abutment parts 731, respectively.

As shown in FIGS. 8 to 11, when the first change part 84 is at (in) a pivot position in which the flat surface 842 of each of the cam parts 841 extends in parallel to the longitudinal axis A1 (i.e., the flat surface 842 orthogonally intersects the up-down direction) and the curved surface 843 of each of the cam parts 841 protrudes upward relative to the flat surface 842, the biasing members 71 bias the rear end portion of the support body 13 upward via the blocking member 73. The pivot position of the first change part 84 at this time is hereinafter referred to as a release position.

More specifically, when the first change part 84 is at (in) the release position, the biasing members 71 bias the blocking member 73 upward relative to the gear housing 12, so that the second abutment part 735 abuts (contacts) the abutment part 133 of the support body 13 from below and pushes the rear end portion of the support body 13 upward. In other words, the biasing members 71 bias the support body 13 in the direction in which the cutting edge 913 of the blade 91 oscillates (moves) downward. As described above, the rear end portion of the support body 13 is biased downward by the two biasing members 63 (see FIG. 3) of the orbital mechanism 6. The upward biasing force exerted by the two biasing members 71 of the biasing mechanism 7 is set to be larger than the downward biasing force exerted by the biasing members 63 of the orbital mechanism 6. Therefore, the blocking member 73 is held in its uppermost position where the first abutment parts 731 respectively abut (contact) the flat surfaces 842 of the cam parts 841, and the rear end portion of the support body 13 is held in its uppermost position where the upper wall of the support body 13 generally abuts (contacts) the upper wall of the gear housing 12. In this manner, when the first change part 84 is at (in) the release position, the first change part 84 enables (allows) the operation of the biasing mechanism 7.

As shown in FIGS. 12 to 15, when the first change part 84 is at (in) a pivot position where the flat surface 842 of each of the cam parts 841 orthogonally intersects the longitudinal axis A1 (i.e., extends in the up-down direction) and the curved surface 843 of each of the cam parts 841 protrudes rearward relative to the flat surface 842, a lower corner (edge, boundary) between the flat surface 842 and the curved surface 843 presses the first abutment part 731 of the blocking member 73 from above. The cam parts 841 thus hold the blocking member 73 at (in) a specified position while compressing the biasing members 71. The pivot position of the first change part 84 at this time is hereinafter referred to as a first blocking position (or a first interruption position). The position of the blocking member 73 in the up-down direction at this time is hereinafter referred to as a blocking position (or an interruption position).

Figure 16:
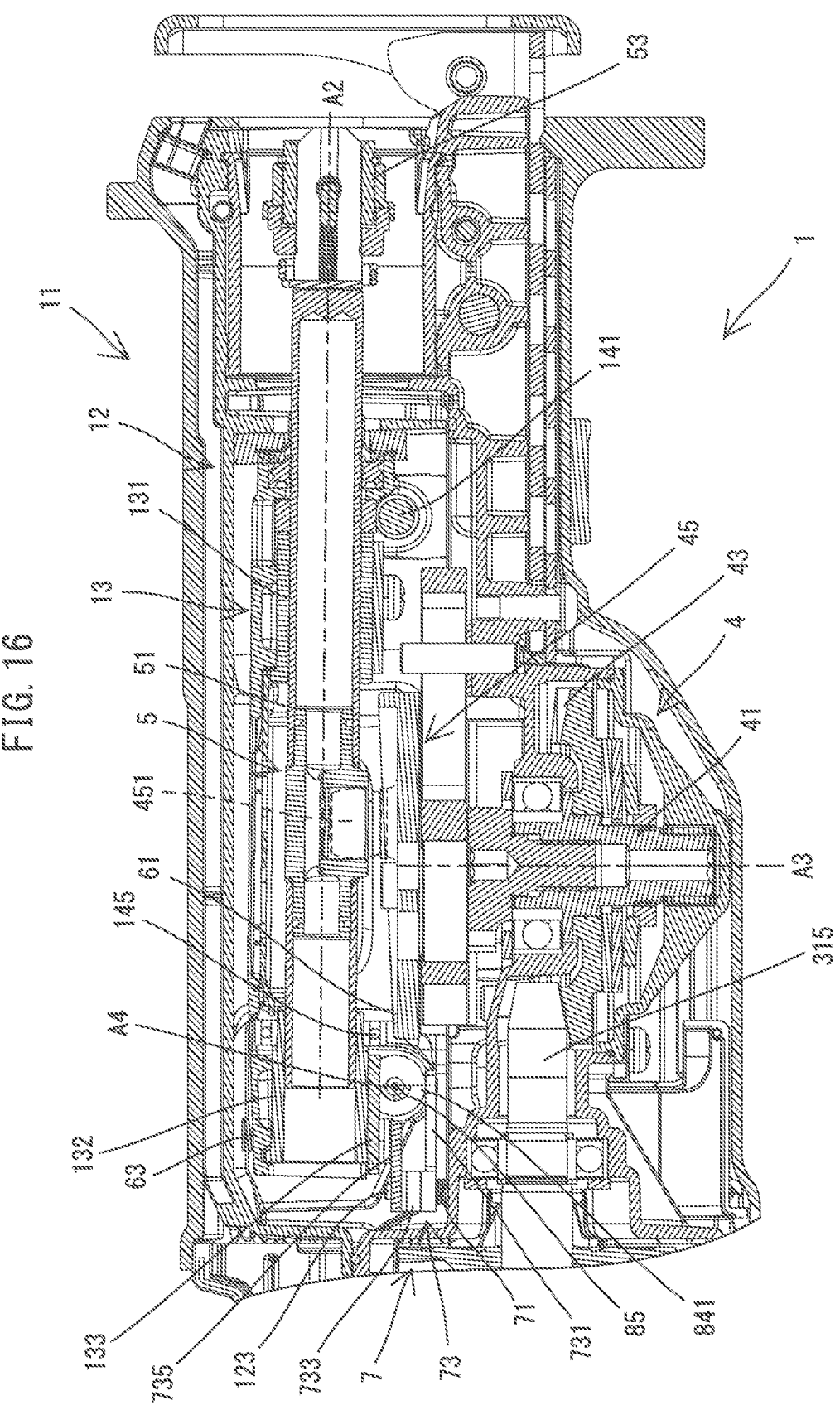
FIG. 16 is a sectional view corresponding to FIG. 12, wherein the slider is at the second slider position.

When the blocking member 73 is at (in) the blocking position, even if the rear end portion of the support body 13 is moved to its lower limit (its lowermost position), the second abutment part 735 of the blocking member 73 is spaced apart downward from the support body 13 (see FIG. 16). Thus, the biasing force of the biasing members 71 is not applied to (does not act on) the support body 13. In other words, the blocking member 73 blocks (prohibits) the biasing members 71 from applying the biasing force to the support body 13. In this manner, when the first change part 84 is at (in) the first blocking position, the first change part 84 disables (prohibits) the operation of the biasing mechanism 7.

As shown in FIGS. 3 and 5 to 7, when the first change part 84 is at (in) a pivot position where the flat surface 842 extends in parallel to the longitudinal axis A1 (i.e., orthogonally intersects the up-down direction) and the curved surface 843 protrudes downward from the flat surface 842, the cam parts 841 respectively press the first abutment parts 731 of the blocking member 73 from above. The cam part 841 thus hold the blocking member 73 at (in) the blocking position while compressing the biasing members 71. The pivot position of the first change part 84 at this time is hereinafter referred to as a second blocking position (or a second interruption position). Even if the rear end portion of the support body 13 is moved to its lower limit, the second abutment part 735 of the blocking member 73 is spaced apart downward from the support body 13 (see FIG. 4). The blocking member 73 thus blocks (prevents) the biasing members 71 from applying the biasing force to the support body 13. In this manner, when the first change part 84 is at (in) the second blocking position, the first change part 84 disables (prohibits) the operation of the biasing mechanism 7.

The second change part 85 is now described in more detail.

As shown in FIGS. 3, 5 and 6, the second change part 85 is a cam part disposed on a central portion of the change shaft 83 in the left-right direction. More specifically, the second change part 85 is a cam part having a substantially semicircular section, similar to the cam part 841 of the first change part 84. An outer surface of the second change part 85 includes a flat surface 852, which contains the rotational axis A4, and an arc-shaped curved surface 853. The flat surface 852 is in the same plane as the flat surfaces 842 of the cam parts 841 of the first change part 84. A radius of the second change part 85 (the cam part) is set to be smaller than a radius of the cam part 841. The length in the left-right direction of the second change part 85 is slightly larger than the width of the abutment part 133 of the support body 13 in the left-right direction.

As shown in FIGS. 3, 5 and 6, when the second change part 85 is at (in) a pivot position where the flat surface 852 extends in parallel to the longitudinal axis A1 (i.e., orthogonally intersects the up-down direction) and the curved surface 853 protrudes downward relative to the flat surface 852, even if the rear end portion of the support body 13 is moved to its lower limit, the abutment part 133 of the support body 13 does not abut (contact) the second change part 85 (see FIGS. 3 and 4). The pivot position of the second change part 85 at this time is hereinafter referred to as a non-contact position (or a spaced-apart position). When the second change part 85 is at (in) the non-contact position, the rear end portion of the support body 13 can always move downward to a position where the bearing 145 abuts on (follows) the upper end surface (the cam surface) of the cam part 61 of the crank plate 45 (see FIG. 4) during (in) one rotation (in a 360-degree turn) of the crank plate 45. In this manner, when the second change part 85 is at (in) the non-contact position, the second change part 85 completely allows the operation of the orbital mechanism 6.

As shown in FIGS. 12 to 15, when the second change part 85 is at (in) a pivot position where the flat surface 852 orthogonally intersects the longitudinal axis A1 (i.e., extends in the up-down direction) and the curved surface 853 protrudes rearward relative to the flat surface 852, an upper corner (edge, boundary) between the flat surface 852 and the curved surface 853 abuts (contacts) the abutment part 133 of the support body 13 from below (see FIG. 16) for a certain period during (in) one rotation (a 360-degree turn) of the crank plate 45. The pivot position of the second change part 85 at this time is hereinafter referred to as a first contact position. The second abutment part 85, when placed at the first contact position, can thus abut (contact) the abutment part 133 of the support body 13 and prevent the rear end portion of the support body 13 from further moving downward.

Accordingly, the bearing 145 cannot abut on (come into contact with) the upper end surface of the cam part 61 in at least a portion of the process in which the crank plate 45 makes one rotation (a 360-degree turn). Thus, although the support body 13 slightly oscillates (pivots, rocks) in the up-down direction in response to the movement of the slider 5 in the front-rear direction, the orbital motion of the blade 91 is smaller, compared to the orbital motion when the second change part 85 is at the non-contact position. In this manner, when the second change part 85 is at (in) the first contact position, the second change part 85 partially blocks (prevents, restricts, limits) the operation of the orbital mechanism 6.

As shown in FIGS. 8 to 11, when the second change part 85 is at (in) a pivot position where the flat surface 852 extends in parallel to the longitudinal axis A1 (i.e., orthogonally intersects the up-down direction) and the curved surface 853 protrudes upward relative to the flat surface 852, a portion of the curved surface 853 that protrudes most from the flat surface 852 abuts (contacts) the abutment part 133 of the support body 13 from below (see FIG. 19) for a certain period during (in) one rotation (a 360-degree turn) of the crank plate 45. The pivot position of the second change part 85 at this time is hereinafter referred to as a second contact position. The second change part 85, when placed at the second contact position, can thus abut (contacts) the abutment part 133 of the support body 13 and prevent the rear end portion of the support body 13 from further moving downward, similar to when the second change part 85 is at the first contact position.

Accordingly, the bearing 145 cannot abut on (contact) the upper end surface of the cam part 61 in at least a portion of the process in which the crank plate 45 makes one rotation (a 360-degree turn). In this manner, when the second change part 85 is at (in) the second contact position as well, the second change part 85 partially blocks (prevents, restricts, limits) the operation of the orbital mechanism 6.

The operation of the reciprocating saw 1 in each of the first to third action modes is now described.

First, the operation of the reciprocating saw 1 in the first action mode is described.

Figure 9:
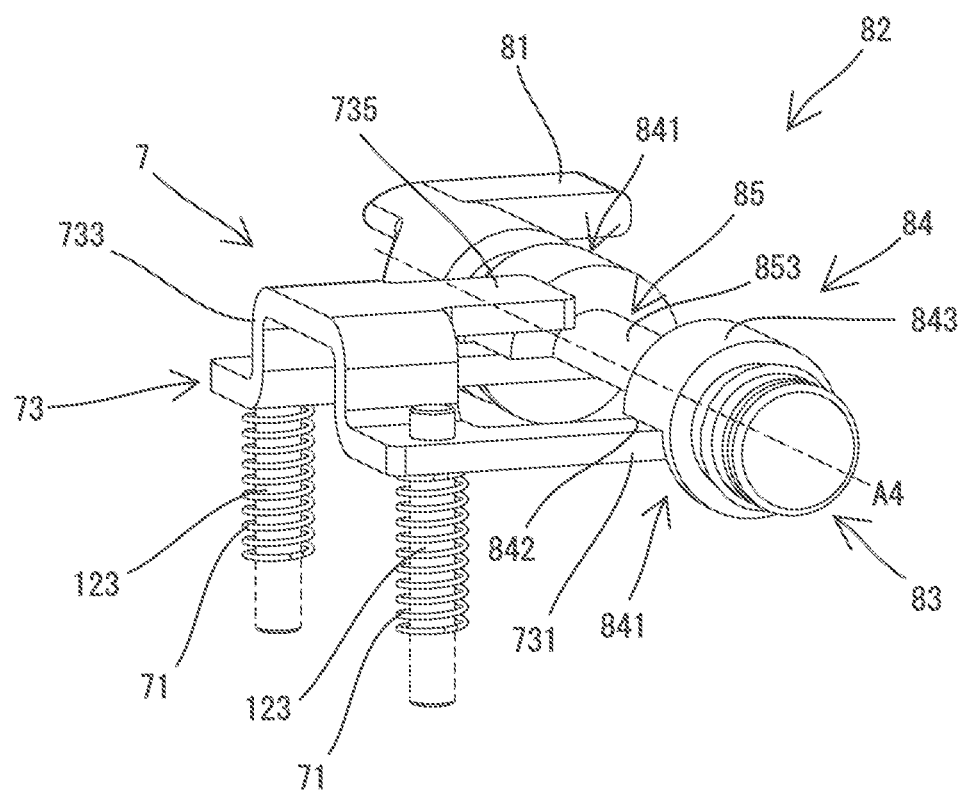
FIG. 9 is a perspective view of the biasing mechanism, the change lever and the change mechanism when the first action mode is selected.
Figure 10:
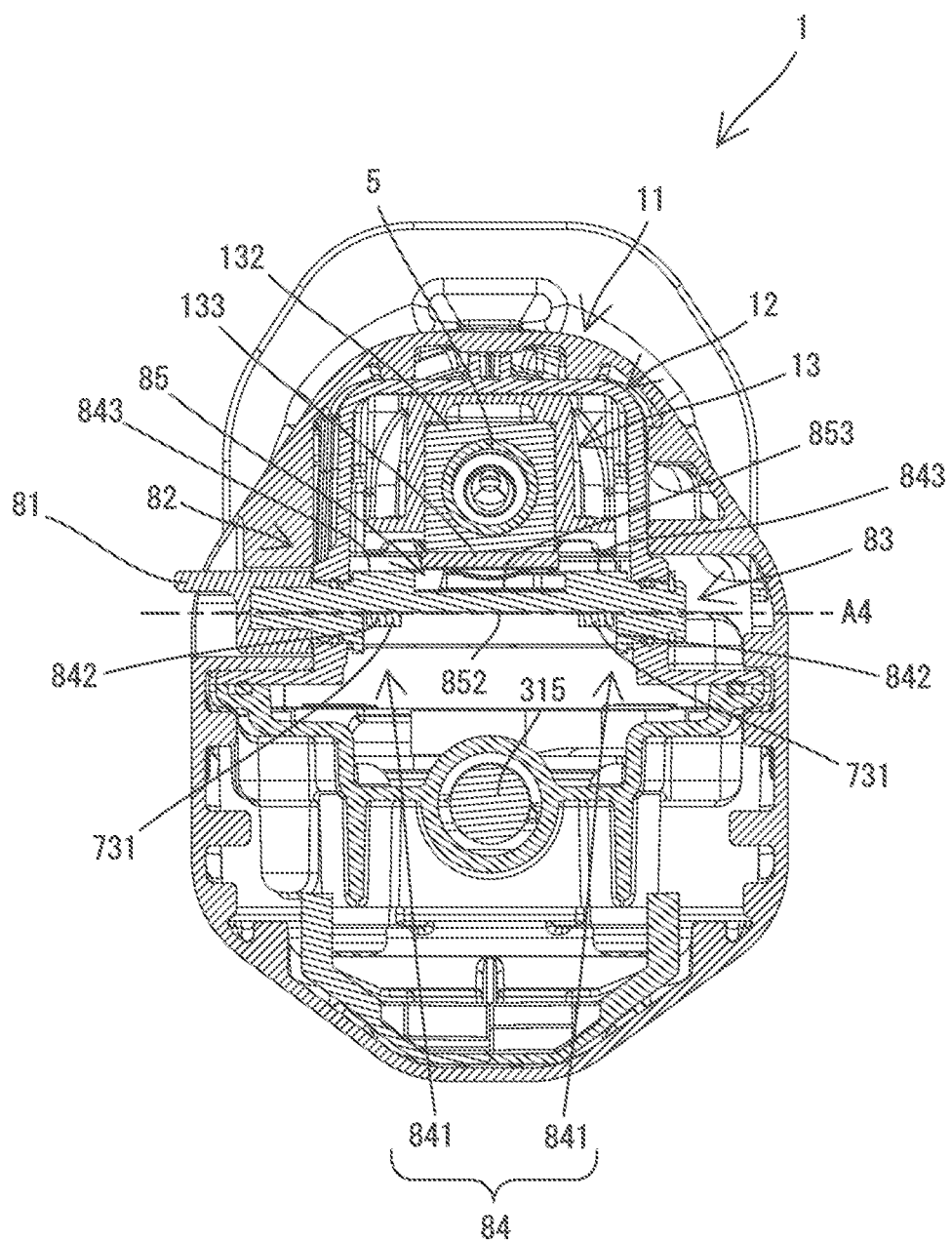
FIG. 10 is a sectional view taken along line X-X in FIG. 8.
Figure 11:
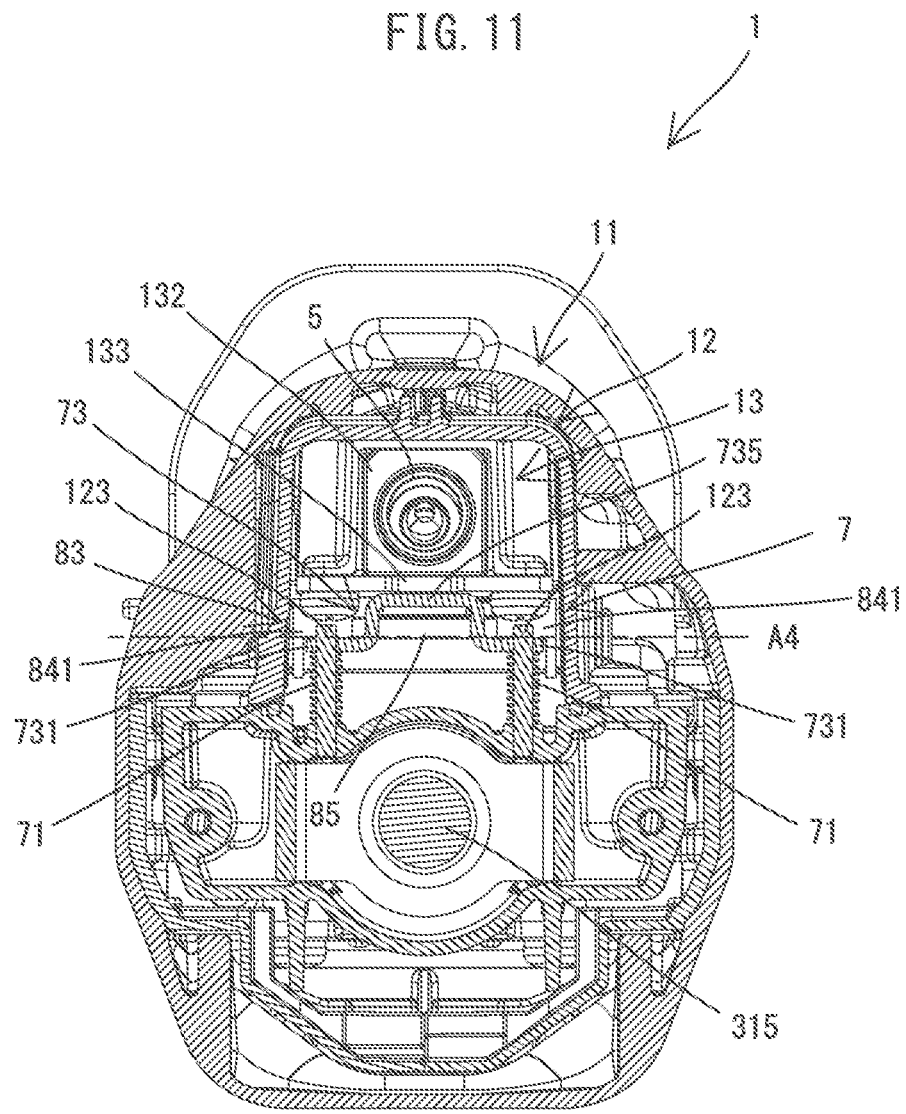
FIG. 11 is a sectional view taken along line XI-XI in FIG. 8.

The user sets (places) the change lever 81 at (in) the pivot position (hereinafter referred to as a first pivot position) corresponding to the first action mode. In the present embodiment, as shown in FIG. 9, when placed at (in) the first pivot position, the tip end of the change lever 81 is directed (faces) forward. When the change lever 81 is at the first pivot position, the first change part 84 is at the release position, so that the operation of the biasing mechanism 7 is enabled. Further, the second change part 85 of the change shaft 83 is at the second contact position, so that the operation of the orbital mechanism 6 is partially blocked (impeded, prevented).

When the motor 31 is driven, the crank plate 45 is rotated and thus the slider 5 is reciprocally slides along the driving axis A2 of the support body 13.

As described above, in the first action mode, the biasing members 71 bias the abutment part 133 upward via the second abutment part 735 of the blocking member 73, so that the support body 13 is biased in the direction in which the cutting edge 913 of the blade 91 oscillates (pivots, rocks) downward.

Figure 8:
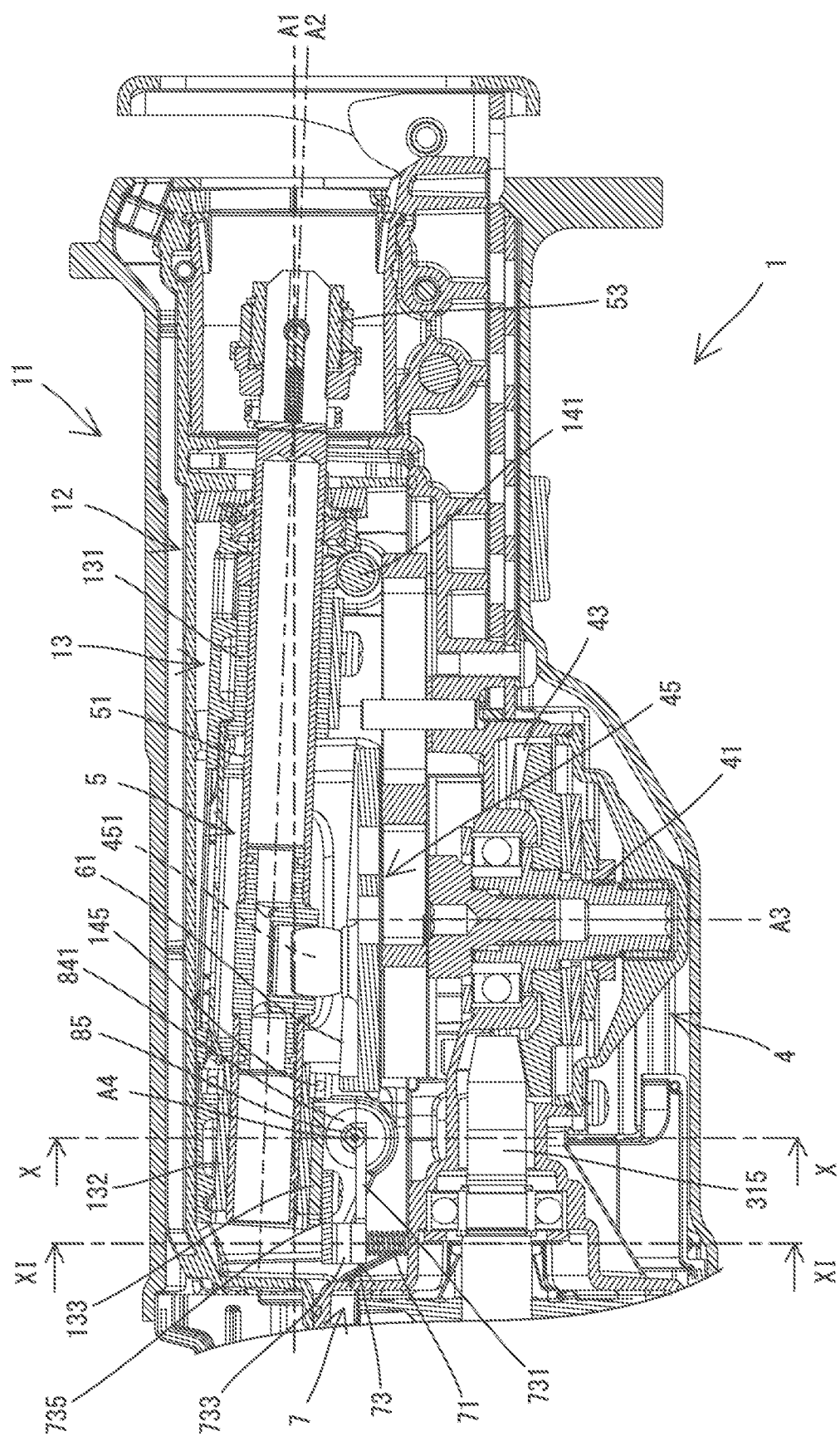
FIG. 8 is a partial, sectional view of the reciprocating saw, wherein the slider is at the first slider position in a no-load state in a first action mode.

Thus, as shown in FIG. 8, when the cutting edge 913 of the blade 91 is not being pressed against a workpiece, and the slider 5 is located at the first slider position, the rear end portion of the support body 13 is located at (in) its uppermost position. The state of the blade 91 when the cutting edge 913 of the blade 91 is not being pressed against the workpiece (i.e., when a load is not being applied to the blade 91 in a direction in which the cutting edge 913 moves upward) is also referred to as a no-load state. The abutment part 133 is located above the second change part 85. At this time, the bearing 145 is located above the upper end surface of the thickest portion of the cam part 61 of the crank plate

Figure 17:
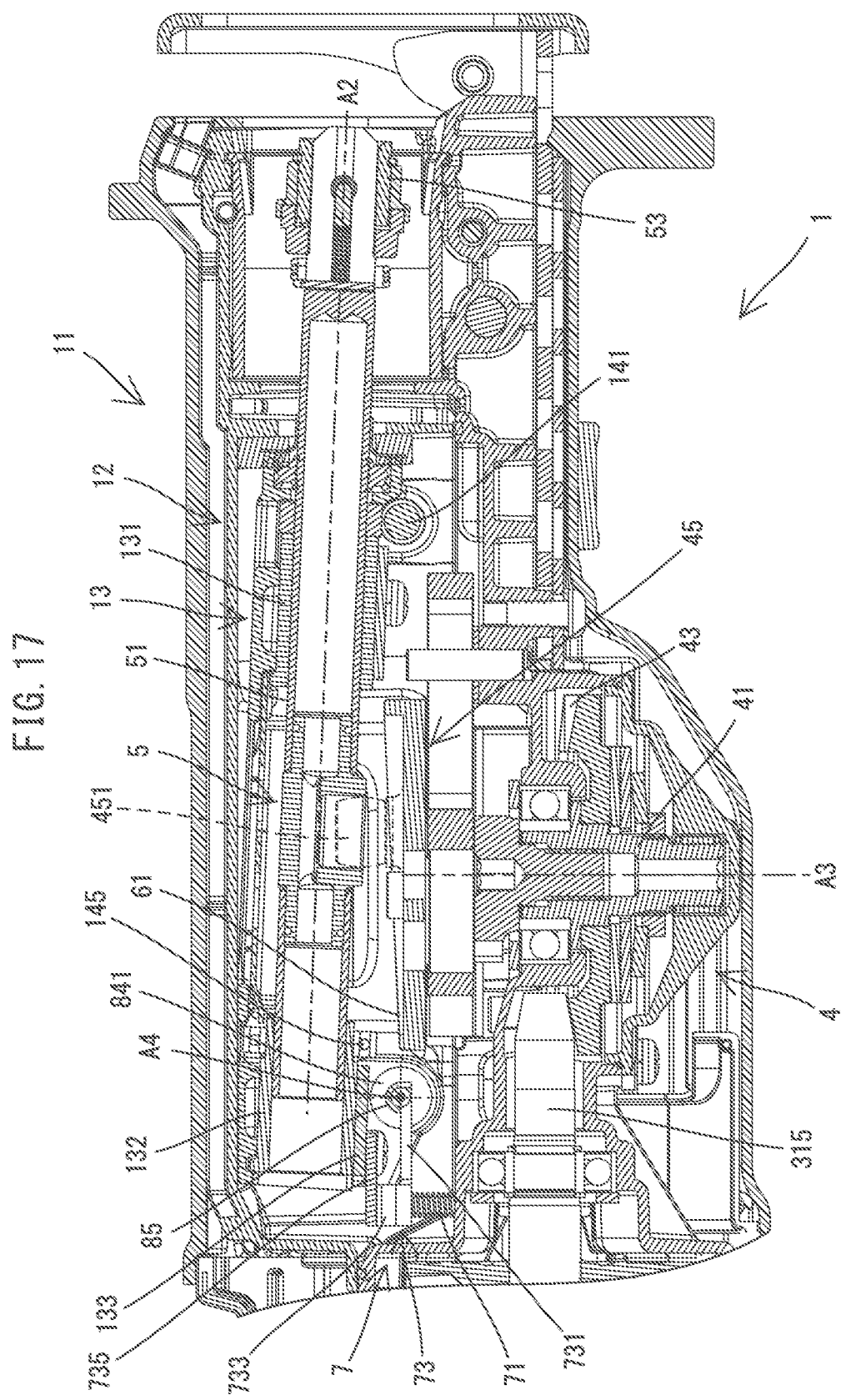
FIG. 17 is a sectional view corresponding to FIG. 8, wherein the slider is at the second slider position in the no-load state in the first action mode.

45. Further, as shown in FIG. 17, also when the slider 5 is at the second slider position, the rear end portion of the support body 13 is located at its uppermost position. The abutment part 133 is located above the second change part 85.

On the other hand, when the cutting edge 913 of the blade 91 is pressed against the workpiece, the rear end portion of the support body 13 can oscillate (pivot, rock) downward while pushing the blocking member 73 downward, against the biasing force of the biasing members 71. The state of the blade 91 when the cutting edge 913 of the blade 91 is pressed against the workpiece (i.e., when the load is being applied to the blade 91 in the direction in which the cutting edge 913 moves upward) is also referred to as a loaded state.

Figure 18:
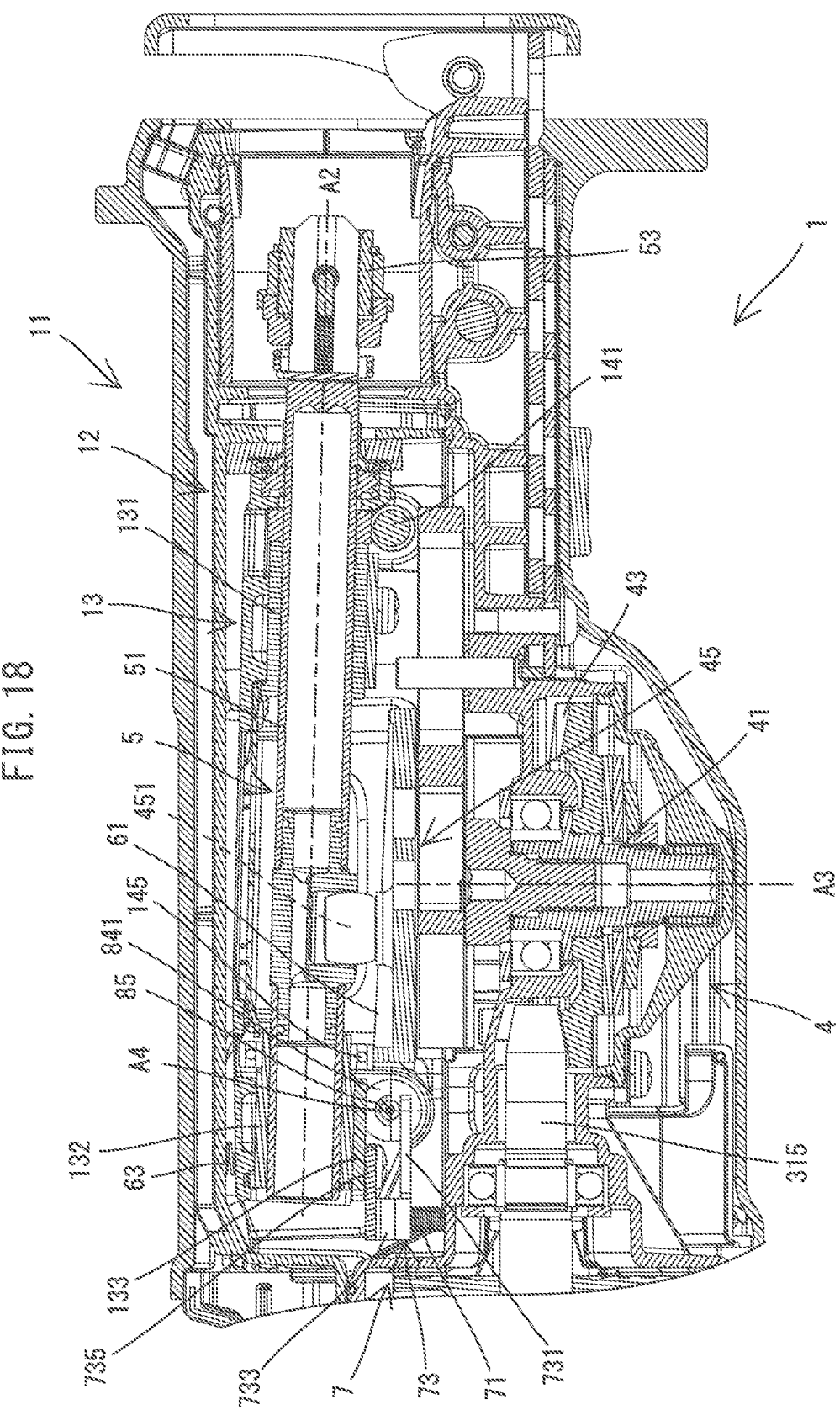
FIG. 18 is a partial, sectional view of the reciprocating saw, wherein the slider is at the first slider position in a loaded state in the first action mode.
Figure 19:
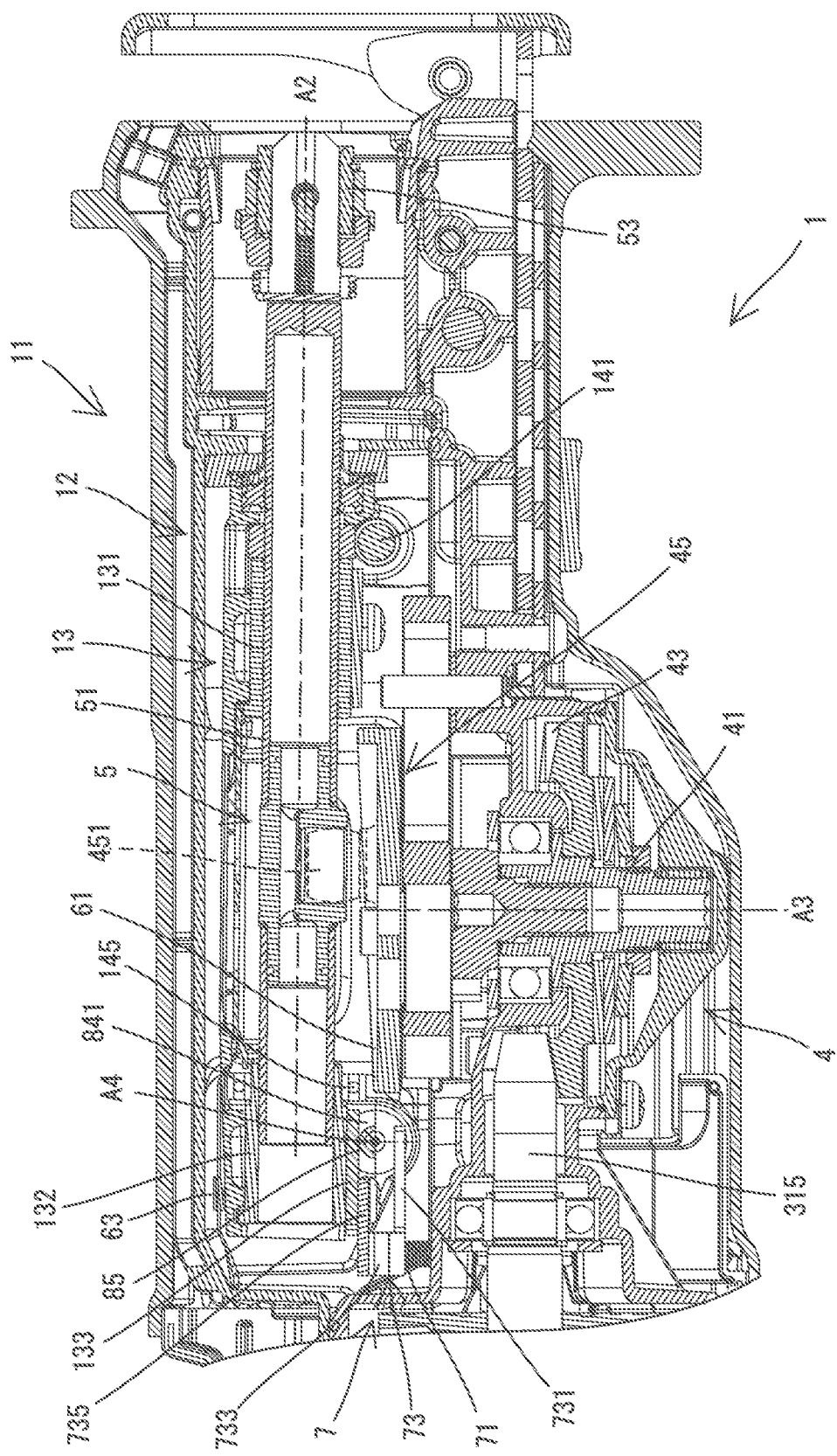
FIG. 19 is a sectional view corresponding to FIG. 18, wherein the slider is at the second slider position in the loaded state in the first action mode.

More specifically, as shown in FIG. 18, when the slider 5 is at the first slider position, the rear end portion of the support body 13 can oscillate downward to a position where the bearing 145 abuts the upper end surface of the thickest portion of the cam part 61. Further, as shown in FIG. 19, when the slider 5 is at the second slider position, the rear end portion of the support body 13 can oscillate downward to a position where the abutment part 133 abuts the second change part 85 (the portion of the curved surface 853 that protrudes most). Thus, in the first action mode, the cam part 61 and the second change part 85 define (limit) an amount of oscillation of the support body 13 and the slider 5 in a direction opposite to the biasing direction of the biasing members 71 (i.e., an amount of movement of the support body 13 and the slider 5 in the up-down direction). In other words, in the first action mode, the cam part 61 and the second change part 85 restrict (limit) oscillation (pivoting movement) of the support body 13 in the direction in which the cutting edge 913 oscillates (pivots) upward.

When a cutting operation on a workpiece by the reciprocating saw 1 is started, the cutting edge 913 of the blade 91 is pressed against the workpiece. At this time, an upward reaction force is applied to the blade 91 from the workpiece. In particular, when the blade 91 is pressed against a relatively hard workpiece, the blade 91 may bounce (spring, jump) upward, owing to the reaction force. To cope with this, in the first action mode, the biasing members 71 bias the support body 13 in the direction in which the blade 91 oscillates (pivots) downward (i.e., toward the workpiece), so that the likelihood of the bounce of the blade 91 can be effectively reduced. Further, when the user presses the blade 91 against the workpiece and thereby the biasing members 71 are deformed to some extent, as described above, the cam part 61 and the second change part 85 restrict the oscillation of the support body 13. Owing to this configuration, the user can stably press the cutting edge 913 against the workpiece.

Next, the operation of the reciprocating saw 1 in the second action mode is described.

Figure 13:
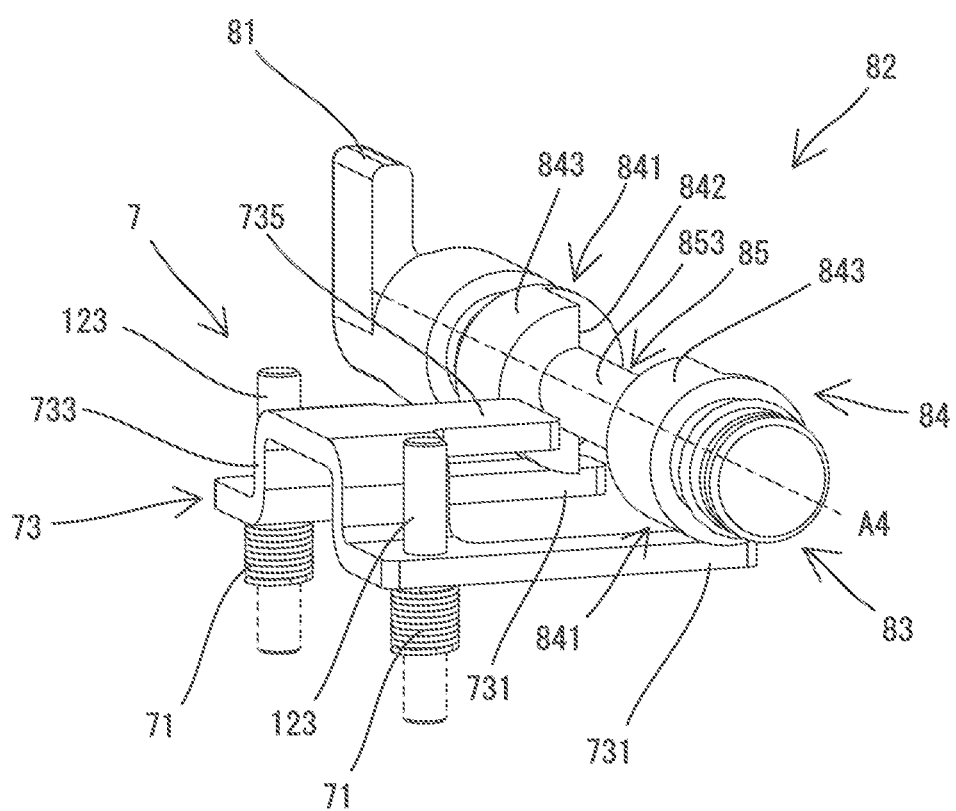
FIG. 13 is a perspective view of the biasing mechanism, the change lever and the change mechanism when the second action mode is selected.
Figure 14:
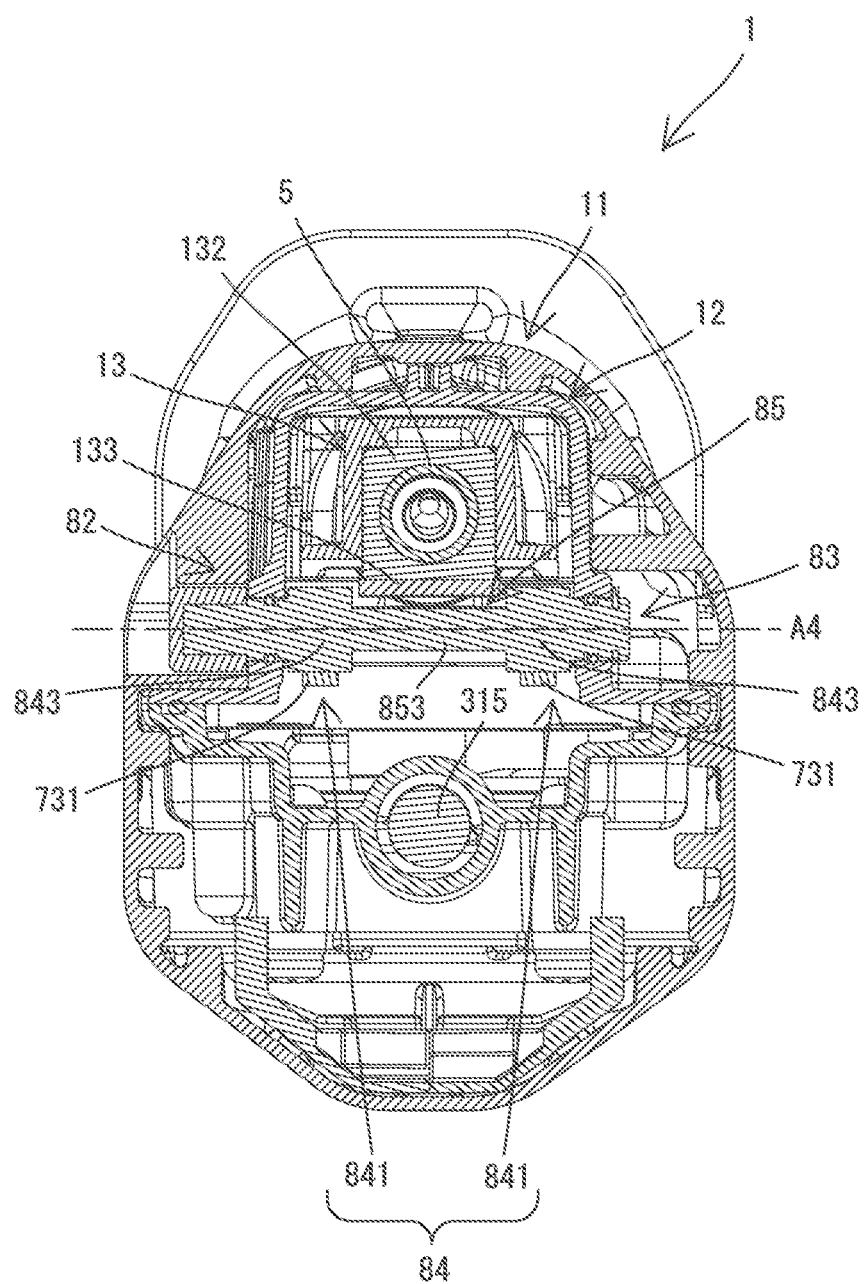
FIG. 14 is a sectional view taken along line XIV-XIV in FIG. 12.
Figure 15:
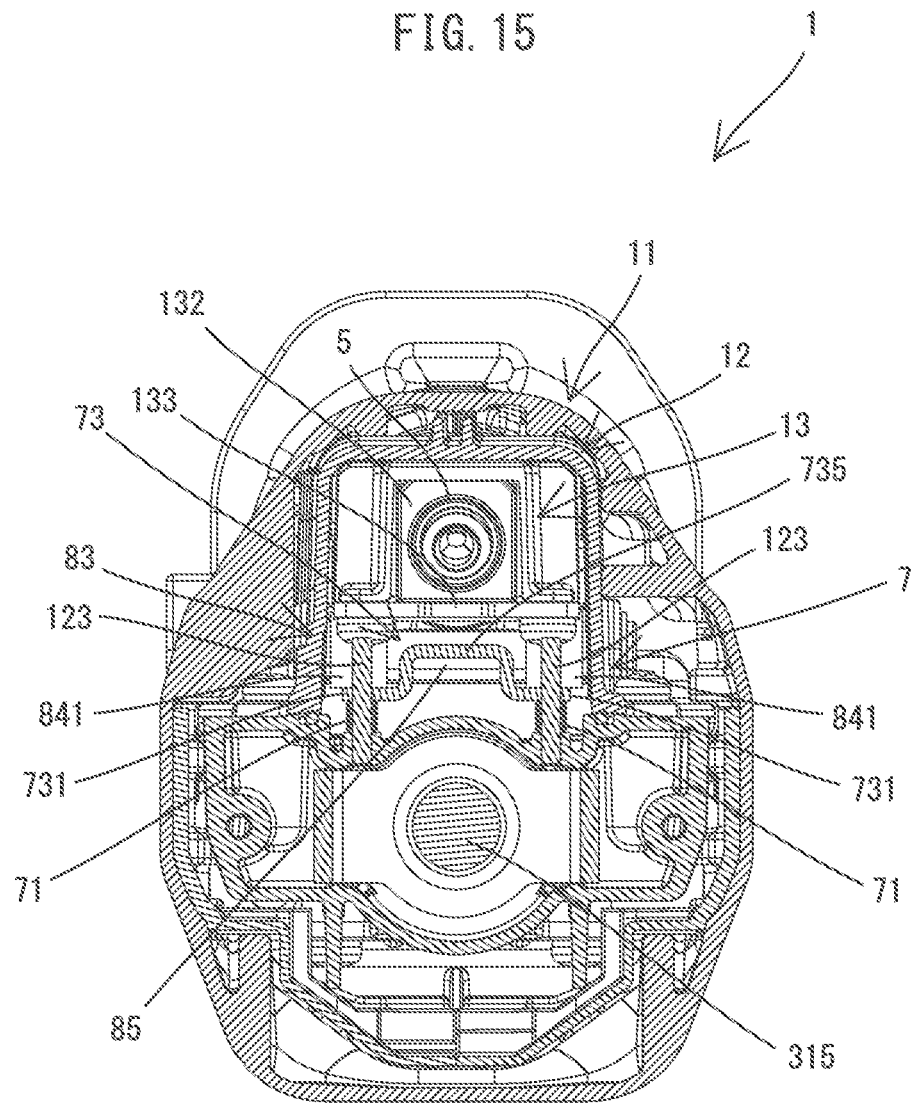
FIG. 15 is a sectional view taken along line XV-XV in FIG. 12.

The user sets (places) the change lever 81 at (in) the pivot position (hereinafter referred to as a second pivot position) corresponding to the second action mode. In the present embodiment, as shown in FIG. 13, when placed at (in) the second pivot position, the tip end of the change lever 81 is directed (faces) upward. When the change lever 81 is at the second pivot position, the first change part 84 is at the first blocking position, so that the operation of the biasing mechanism 7 is disabled. Further, the second change part 85 of the change shaft 83 is at the first contact position, so that the operation of the orbital mechanism 6 is partially blocked (impeded, prevented).

When the motor 31 is driven, the crank plate 45 is rotated and thus the slider 5 reciprocally slides along the driving axis A2 of the support body 13. While the slider 5 reciprocates, the blocking member 73 is held in the blocking position by the first change part 84. Therefore, the second abutment part 735 is always spaced apart downward from the abutment part 133 of the support body 13, regardless of the movement of the slider 5.

Figure 12:
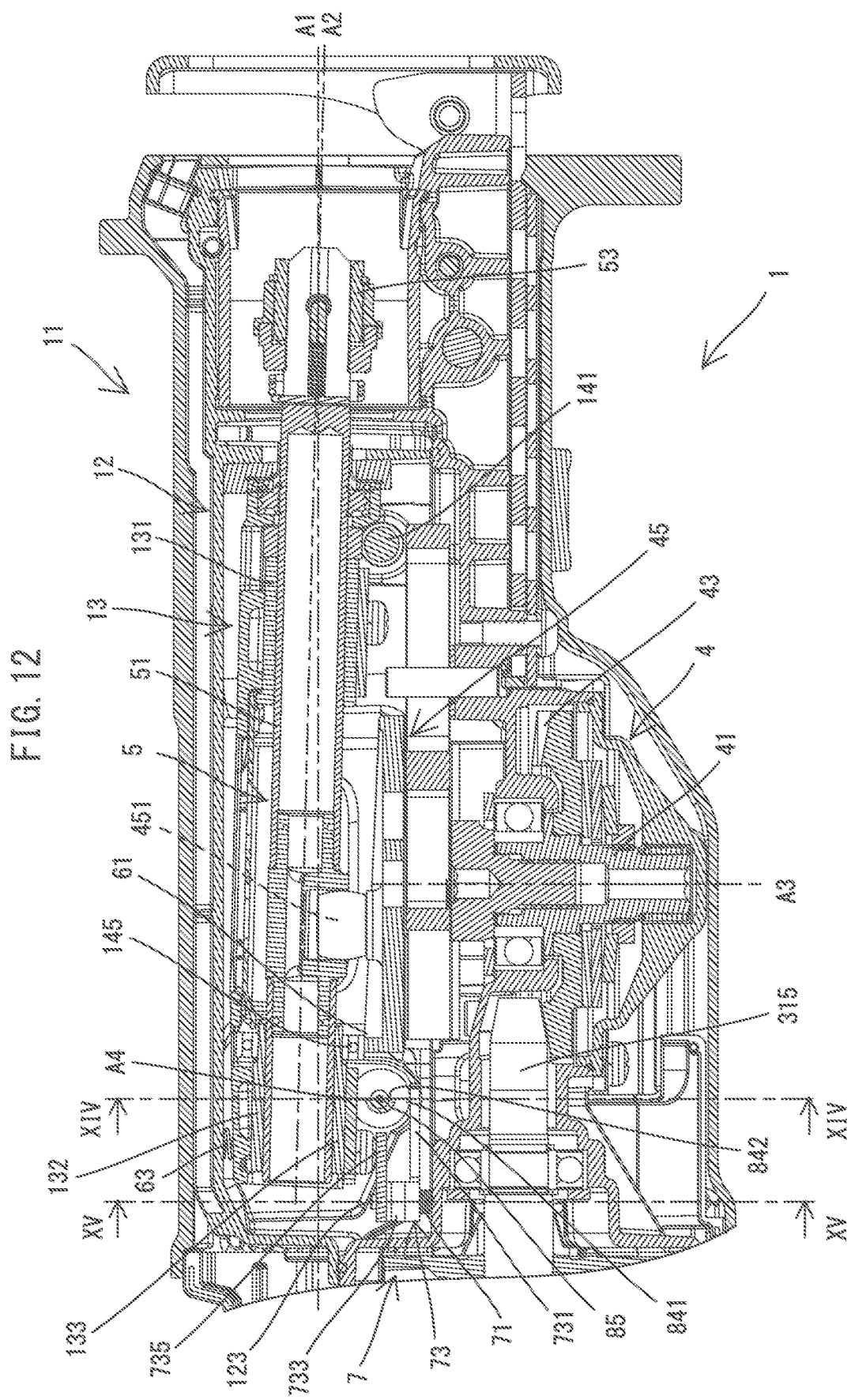
FIG. 12 is a partial, sectional view of the reciprocating saw, wherein the slider is at the first slider position in a second action mode.

As shown in FIG. 12, when the slider 5 is at the first slider position, the second change part 85 is located below the abutment part 133 and the bearing 145 abuts the thickest portion of the cam part 61. As shown in FIG. 16, when the slider 5 is at the second slider position, the second change part 85 abuts the abutment part 133 from below so as to prevent the rear end portion of the support body 13 from moving further downward. Accordingly, the bearing 145 is spaced apart upward from the thinnest portion of the cam part 61. Thus, the oscillation of the support body 13 in the up-down direction during the reciprocation of the slider 5 is relatively small, so that the blade 91 provides (imparts, generates) a relatively small orbital motion.

Next, the operation of the reciprocating saw 1 in the third action mode is described.

The user sets (places) the change lever 81 at (in) the pivot position (hereinafter referred to as a third pivot position) corresponding to the third action mode. In the present embodiment, as shown in FIG. 5, when placed at (in) the third pivot position, the tip end of the change lever 81 is directed (faces) rearward. When the change lever 81 is at the third pivot position, the first change part 84 is at the second blocking position, so that the operation of the biasing mechanism 7 is disabled. Further, the second change part 85 of the change shaft 83 is at the non-contact position, so that the operation of the orbital mechanism 6 is completely allowed.

When the motor 31 is driven, the crank plate 45 is rotated and thus the slider 5 reciprocally slides along the driving axis A2 of the support body 13. Similar to the second action mode, while the slider 5 reciprocates, the blocking member 73 is held in the blocking position by the first change part 84. Therefore, the second abutment part 735 is always spaced apart downward from the abutment part 133 of the support body 13, regardless of the movement of the slider 5.

On the other hand, as shown in FIG. 3, when the slider 5 is at the first slider position, the second change part 85 is located below the abutment part 133 and the bearing 145 abuts the thickest portion of the cam part 61. As shown in FIG. 4, when the slider 5 is at the second slider position, the second change part 85 is also located below the abutment part 133. Therefore, the rear end portion of the support body 13 is biased downward by the biasing member 63, so that the bearing 145 abuts the thinnest portion of the cam part 61. Thus, the support body 13 fully oscillates in the up-down direction while the slider 5 is reciprocating, so that the blade 91 provides (imparts, generates) a larger orbital motion than in the second action mode.

As described above, in the present embodiment, by manually pivoting the change lever 81, the user can change the state of the biasing members 71 via the first change part 84. Thus, for example, when it is anticipated that the reaction force from the workpiece will be relatively large, the user can select the first action mode using the change lever 81 such that the biasing members 71 are enabled to bias the support body 13. On the contrary, when it is anticipated that the reaction force from the workpiece will be relatively small, the user can select the second action mode or the third action mode using the change lever 81 such that the biasing members 71 are disabled to bias the support body 13. When the biasing members 71 are disabled to bias the support body 13, the rear end portion of the support body 13 is not biased upward relative to the body housing 11 (the gear housing 12). Thus, in the second action mode and the third action mode, the amount by which the support body 13 oscillates until the rear end portion of the support body 13 is prevented (blocked) from moving downward is smaller than that in the first action mode. Consequently, the user can more easily and stably press the cutting edge 913 against the workpiece. In this manner, according to the reciprocating saw 1 of the present embodiment, the user can selectively set the biasing members 71 in an appropriate state by manipulating the change lever 81, depending on the actual condition of the cutting operation.

Further, in the present embodiment, the first change part 84 includes the cam parts 841 disposed on the change shaft 83 that are operably coupled to the change lever 81 so as to pivot in response to pivoting of the change lever 81. The cam parts 841 selectively abut (come into contact with) the blocking member 73 in response to the pivoting of the change shaft 83 so as to move the blocking member 73 to the blocking position. In this manner, the blocking member 73 can be moved to easily change the state of the biasing members 71, utilizing a simple structure, that is, the change shaft 83 having the cam parts 841.

Further, in the present embodiment, the biasing members 71 are compression coil springs and the blocking member 73 is disposed between the support body 13 and these compression coil springs to be movable in the up-down direction. Further, in response to the manual pivoting of the change lever 81, the cam parts 841 selectively hold the blocking member 73 at (in) the blocking position, at (in) which the blocking member 73 is spaced apart from the support body 13, or allow the blocking member 73 to abut (come into contact with) the support body 13. When the blocking member 73 is allowed to abut the support body 13, the biasing members 71 (the compression coil springs) bias the support body 13 via the blocking member 73. In this manner, in the present embodiment, a relatively simple and rational structure for changing the state of the biasing members 71 is realized by utilizing the biasing members 71 (the compression coil springs) and the blocking member 73. In addition, the support pins 123 each support the biasing member 71 and the blocking member 73. Thus, a compact and simple support structure for supporting the biasing members 71 and the blocking member 73 is realized.

In the reciprocating saw 1 of the present embodiment, by simply manually pivoting the change lever 81, the user can change not only the state of the biasing mechanism 7 but also the state of the orbital mechanism 6 (the magnitude of the orbital motion of the blade 91) via the second change part 85. The orbital motion of the blade 91 can enhance cutting efficiency. On the other hand, the orbital motion may not be suitable for cutting a relatively hard metal workpiece. Accordingly, the user can set the orbital mechanism 6 in an appropriate state by manipulating the change lever 81, depending on the actual conditions of the cutting operation. Thus, usability of the reciprocating saw 1 can be further improved.

In the present embodiment, the second change part 85 for changing the state of the orbital mechanism 6 is configured as a cam part that is disposed on the change shaft 83, similar to the first change part 84 for changing the state of the biasing members 71. Further, the state of the biasing members 71 and the state of the orbital mechanism 6 are selectively changed by selectively setting (placing) the change lever 81 at one of the first pivot position, the second pivot position and the third pivot position. Thus, by simply manually pivoting the change lever 81, the user can select a combination, which is suitable to the actual conditions, from among at least three combinations of the state of the biasing members 71 and the state of the orbital mechanism 6 (e.g., from the first action mode, the second action mode and the third action mode).

In the present embodiment, a rational mechanism is realized for reciprocally moving the slider 5 and generating the orbital motion of the blade 91 at the same time by utilizing the crank plate 45 having the crank pin 451 and the cam part 61. Further, both of the state of the biasing members 71 and the state of the orbital mechanism 6 can be changed by a simple structure, that is, the single change shaft 83, and the first change part 81 (the cam parts 841) and the second change part (the cam part) 85 disposed on the change shaft 83.

Correspondences between the features of the present embodiment and the features of the present disclosure or the invention are as follows. However, the features of the embodiment are merely non-limiting examples, and therefore the features of the present disclosure are not limited thereto.

The reciprocating saw 1 is an example of the "reciprocating tool". Each of the body housing 11 and the gear housing 12 is an example of the "housing". The longitudinal axis A1 is an example of the "first axis". The support body 13 is an example of the "support body". The slider 5 is an example of the "slider". The blade 91 and the cutting edge 913 are examples of the "blade" and the "cutting edge", respectively. The motor 31 is an example of the "motor". The driving mechanism 4 is an example of the "driving mechanism". The biasing member 71 is an example of the "first biasing member". The change lever 81 is an example of the "manipulation member". The change mechanism 8 (specifically, the change shaft 83 and the first change part 84) is an example of the "first change mechanism".

The blocking member 73 is an example of the "blocking member". The change shaft 83 is an example of the "movable member". The cam part 841 is an example of the "cam part". The orbital mechanism 6 is an example of the "orbital mechanism". The change mechanism 8 (specifically, the change shaft 83 and the second change part 85) is an example of the "second change mechanism". The change shaft 83 is an example of the "common shaft". The first change part 84 (the cam part 841) is an example of the "first change part". The second change part 85 is an example of the "second change part". The cam part 841 is an example of the "first cam part". The second change part 85 (the cam part) is an example of the "second cam part". The crank plate 45 and the crank pin 415 are examples of the "crank plate" and the "crank pin", respectively. The cam part 61 is an example of the "third cam part". The biasing member 63 is an example of the "second biasing member". Each of the cam part 61 and the second change part 85 is an example of the "abutment part". The biasing member 71 is an example of the "compression coil spring". The support pin 123 is an example of the "common support member".

The above-described embodiment is merely exemplary, and a reciprocating tool according to the present disclosure is not limited to the reciprocating saw 1 of the above-described embodiment. For example, the following modifications may be made. Further, at least one of these modifications may be employed independently or in combination with at least one of the reciprocating saw 1 of the above-described embodiment and the claimed features.

For example, reciprocating tools according to the present disclosure may be configured as a jigsaw. In addition or in the alternative, reciprocating tools according to the present disclosure may be driven by electric power supplied via a power cord connected to an external AC power source, instead of the battery 93, in which case the motor 31 may be an AC motor. Further, a brushed motor may be employed as the motor 31.

In addition or in the alternative, the mechanism that reciprocates the blade 91 is not limited to the driving mechanism 4. Any known mechanism configured to convert the rotation of the motor shaft 315 into linear reciprocating motion and to transmit the reciprocating motion to the blade 91 may be employed. For example, an oscillating member (so-called a swash bearing or wobble plate) that oscillates in response to rotation of a rotary member may be employed to perform the motion conversion. In addition or in the alternative, a crank pin of the crank plate may be connected to the slider 5 via a connecting rod. The combination and arrangements of various shafts and the gear may be appropriately changed.

Similarly, the mechanism that causes (generates) the orbital motion of the blade 91 is not limited to the orbital mechanism 6. Any known mechanism that acts on the support body 13 or on the slider 5 to cause the orbital motion of the blade 91 may be employed. For example, a member that is operably coupled to the support body 13 and causes the support body 13 to oscillate may be disposed separately from the crank plate 45. In addition or in the alternative, the orbital mechanism 6 may be omitted. For example, the reciprocating saw 1 may have only the first action mode and another action mode in which the blade 91 only reciprocates linearly in the front-rear direction. In addition or in the alternative, the reciprocating saw 1 may only have the first action mode and the third action mode. That is, the reciprocating saw 1 may generate only one kind of the orbital motion, in which case the second change part 85 configured to change the action of the orbital mechanism 6 can be omitted. In addition or in the alternative, in the second action mode, the blade 91 may be linearly reciprocated only in the front-rear direction. That is, the second change part 85 may be configured to selectively enable and disable (activate and deactivate) the action of the orbital mechanism 6.

The arrangements of the motor 31, the driving mechanism 4 and the slider 5 within the body housing 11 are not limited to the example in the above-described embodiment. For example, the motor 31 may be arranged such that the rotational axis of the motor shaft 15 intersects the longitudinal axis A1 of the body housing 11. In addition or in the alternative, the crank plate 45 may be rotatable around a rotational axis extending in the left-right direction, and the slider 5 may be arranged rightward or leftward of the crank plate 45.

The shapes, the components, the connection structure of the body housing 11 and the handle 18 are not especially limited and may be appropriately changed. Similarly, the gear housing 12 within the body housing 11 may be appropriately changed according to or regardless of the change of the driving mechanism 4, the slider 5, etc. disposed within the gear housing 12. In addition or in the alternative, a housing having the gear housing 12 at least partially exposed outside may be employed.

The shape and the components of the slider 5 and the structure for coupling the slider 5 to the driving mechanism 4 are not especially limited and may be appropriately changed. For example, the slider 5 may be formed as a rectangular solid bar. In addition or in the alternative, the slider 5 may be formed by a plurality of components connected together.

The support structure for the slider 5 is not limited to the structure including the support body 13. For example, in the above-described embodiment, the support body 13 extends in the front-rear direction within the gear housing 12 and has generally the same length as the body 51 of the slider 5. However, the length and the shape of the support body 13 may be appropriately changed, as long as the support body 13 supports the slider 5 to be linearly movable (slidable) relative to the support body 13.

In the above-described embodiment, the support body 13 is coupled to the gear housing 12 via the pin 141 such that the support body 13 can oscillate (is pivotable, rockable) in the up-down direction around the axis of the pin 141. However, the support body 13 may not need to be coupled to the gear housing 12. Instead, the support body 13 may be simply housed in the gear housing 12 such that the support body 12 can oscillate (is pivotable, rockable) in the up-down direction, in which case the support body 13 may oscillate (pivot, rock) within the gear housing 12 utilizing a portion of the support body 13 as a pivot. In this modification, a guide member that guides the oscillation (pivoting) of the support body 13 and/or the slider 5 may be disposed in the gear housing 12. In addition or in the alternative, the support body 13 may be housed in the gear housing 12 such that the support body 13 is movable in the up-down direction and the entirety of the support body 13 is biased downward by a biasing member(s), (for example, rubber, any kind of spring, elastic (deformable) synthetic resin (polymer) (for example, urethane foam), and an elastic body formed by felt, etc.).

In the above-described embodiment, in the third action mode, the cam part 61 and the second change part 85 both define (limit) the amount of movement of the support body 13 and the slider 5 in the up-down direction. However, an abutment part may be separately disposed in the gear housing 12, instead of the cam part 61 and the second change part 85. The abutment part may be configured to abut (come into contact with) the support body 13 or the slider 5 to define (limit) the amount of movement of the support body 13 and the slider 5 in the up-down direction.

The kind, the number, and the arrangement of the biasing member(s) 71 that biases the support body 13 and/or the slider 5 are not especially limited and may be appropriately changed. For example, the biasing member 71 may be a spring other than the compression coil spring (for example, a tension coil spring, a flat spring, and a torsion spring), rubber, elastic (deformable) synthetic resin (polymer) (for example, urethane foam), and an elastic body formed by felt, etc. The number of the biasing members 71 may be one or three or more.

In the above-described embodiment, the biasing members 71 are configured to indirectly bias the slider 5, by biasing the support body 13. In place of this configuration, the biasing members 71 may be configured to bias the slider 5 directly or via a member other than the support body 13 (for example, via the blocking member 73). In addition or in the alternative, when the support body 13 and the slider 5 oscillate in the up-down direction, the biasing members 71 may bias the front end portion of the support body 13 or of the slider 5 downward, instead of biasing the rear end portion of the support body 13 or of the slider 5 upward. Alternatively, at least one of the biasing members 71 may bias the rear end portion of the support body 13 or of the slider 5 upward and at least another one of the biasing members 71 may bias the front end portion of the support body 13 or of the slider 5 downward.

The structure that is configured to block (interrupt) the biasing of the biasing members 71 may be appropriately changed. For example, instead of the blocking member 73, another member may be employed that is configured to abut (come into contact with) the rear end portion of the support body 13 or of the slider 5 from above to block (prohibit) the oscillation of the support body 13 and the slider 5, in response to manual pivoting of the change lever 81.

The change lever 81 and the change mechanism 82 may be appropriately modified. For example, instead of the rotary change lever 81, a manipulation member (manually operable member) may be employed that is configured to move linearly when manipulated by a user. In response to such a change, instead of the change shaft 83, a movable member may be employed that is configured to move linearly in response to the linear movement of the manipulation member. Such a movable member may, similar to the above-described embodiment, move the blocking member 73 such that the blocking member 73 blocks (interrupts) the biasing force of the biasing members 71. Alternatively, the blocking member 73 may be omitted, and the movable member may be configured to block (interrupt) the biasing force. In addition or in the alternative, the arrangements of the first change part 84 and the second change part 85 on the change shaft 83, and the shape and the size of each of the cam parts thereof may be changed. For example, the flat surface 842 of the first change part 84 and the flat surface 852 of the second change part 85 may intersect with each other. Further, the radius of the cam part 841 may be the same as the radius of the second change part (the cam part) 85.

DESCRIPTION OF THE REFERENCE NUMERALS

1: reciprocating saw, 11: body housing, 111: opening, 113: shoe, 12: gear housing, 121: opening, 123: support pin, 13: support body, 130: support hole, 131: sliding contact bearing, 132: sliding contact bearing, 133: abutment part, 141: pin, 145: bearing, 18: handle, 181: grip portion, 182: trigger, 183: switch, 187: battery housing, 30: controller, 31: motor, 311: body part, 315: motor shaft, 316: pinion gear, 4: driving mechanism, 5: slider, 6: orbital mechanism, 7: biasing mechanism, 41: intermediate shaft, 43: bevel gear, 45: crank plate, 451: crank pin, 453: bearing, 455: connection member, 51: body, 53: blade mount part, 55: pin connection part, 551: guide recess, 61: cam part, 63: biasing member, 71: biasing member, 73: blocking member, 731: first abutment part, 733: connection part, 735: second abutment part, 81: change lever, 82: change mechanism, 83: change shaft, 84: first change part, 841: cam part, 842: flat surface, 843: curved surface, 85: second change part, 852: flat surface, 853: curved surface, 91: blade, 911: plate surface, 913: cutting edge, 93: battery, A1: longitudinal axis, A2: driving axis, A3: rotational axis, A4: rotational axis

What is claimed is:

1. A reciprocating tool comprising:
a housing having a first axis that defines a front-rear direction of the reciprocating tool;
a support body supported within the housing;
a slider (i) supported by the support body to be linearly movable relative to the support body and (ii) having a front end portion configured to removably receive a blade having a cutting edge;
a motor;
a driving mechanism operably coupled to the slider and configured to reciprocally move the slider relative to the support body using power of the motor;
a first biasing member configured to selectively bias the slider;
a manipulation member; and
a first change mechanism operably coupled to the manipulation member and configured to selectively enable and disable the first biasing member to bias the slider in response to manipulation of the manipulation member, wherein:
in an up-down direction that is orthogonal to the first axis, a direction to which the cutting edge of the blade is directed in normal use of the reciprocating tool defines a downward direction, and
when biasing of the slider by the first biasing member is enabled by the first change mechanism, the first biasing member biases the slider such that the front end portion of the slider is always biased downward.

2. The reciprocating tool as defined in claim 1, further comprising:
a blocking member configured to selectively block a biasing force of the first biasing member,
wherein the first change mechanism is configured to cause the blocking member to selectively block the biasing force in response to the manipulation of the manipulation member.

3. The reciprocating tool as defined in claim 2, wherein the first change mechanism includes a movable member that is configured to move in response to the manipulation of the manipulation member to selectively move the blocking member to a blocking position where the blocking member blocks the biasing force.

4. The reciprocating tool as defined in claim 3, wherein:
the movable member is a shaft that is operably coupled to the manipulation member and that is pivotable in response to the manipulation of the manipulation member, and
the shaft includes a cam part that is configured to selectively abut the blocking member in response to pivoting of the shaft to move the blocking member to the blocking position.

5. The reciprocating tool as defined in claim 1, further comprising:
an orbital mechanism that is configured to selectively generate an orbital motion of the blade by causing the slider to oscillate in the up-down direction while the driving mechanism reciprocally moves the slider; and
a second change mechanism that is operably coupled to the manipulation member and that is configured to selectively change action of the orbital mechanism in response to the manipulation of the manipulation member.

6. The reciprocating tool as defined in claim 1, further comprising:
an abutment part that is configured to abut the support body or the slider to define an amount by which the slider moves in a second direction that is opposite to a biasing direction of the first biasing member.

7. The reciprocating tool as defined in claim 1, wherein the reciprocating tool is configured such that the slider oscillates relative to the housing in the up-down direction when the biasing of the slider is enabled.

8. The reciprocating tool as defined in claim 1, wherein the first biasing member is below a rear end portion of the slider and biases the rear end portion upward.

9. A reciprocating tool comprising:
a housing having a first axis that defines a front-rear direction of the reciprocating tool;
a support body (i) having a second axis, (ii) generally extending in the front-rear direction, (iii) supported within the housing, (iv) configured to oscillate relative to the housing in an up-down direction that is orthogonal to the first axis;
a slider (i) supported by the support body to be linearly movable relative to the support body along the second axis, (ii) that is an elongate member and (iii) having a front end portion configured to removably receive a blade having a cutting edge;
a motor;
a driving mechanism operably coupled to the slider and configured to reciprocally move the slider relative to the support body along the second axis using power of the motor;
a first biasing member configured to selectively bias the support body;
a manipulation member; and
a first change mechanism operably coupled to the manipulation member and configured to selectively enable and disable the first biasing member to bias the support body in response to manipulation of the manipulation member,
wherein:
in the up-down direction, a direction to which the cutting edge of the blade is directed in normal use of the reciprocating tool defines a downward direction, and
when biasing of the support body by the first biasing member is enabled by the first change mechanism, the first biasing member biases the support body such that a front end portion of the support body always oscillates downward.

10. The reciprocating tool as defined in claim 9, further comprising:
a blocking member configured to selectively block a biasing force of the first biasing member,
wherein the first change mechanism is configured to cause the blocking member to selectively block the biasing force in response to the manipulation of the manipulation member.

11. The reciprocating tool as defined in claim 10, wherein the first change mechanism includes a movable member that is configured to move in response to the manipulation of the manipulation member to selectively move the blocking member to a blocking position where the blocking member blocks the biasing force.

12. The reciprocating tool as defined in claim 11, wherein:
the movable member is a shaft that is operably coupled to the manipulation member and that is pivotable in response to the manipulation of the manipulation member, and
the shaft includes a cam part that is configured to selectively abut the blocking member in response to pivoting of the shaft to move the blocking member to the blocking position.

13. The reciprocating tool as defined in claim 9, further comprising:
an orbital mechanism that is configured to selectively generate an orbital motion of the blade by causing the slider to oscillate in the up-down direction while the driving mechanism reciprocally moves the slider; and
a second change mechanism that is operably coupled to the manipulation member and that is configured to selectively change action of the orbital mechanism in response to the manipulation of the manipulation member.

14. The reciprocating tool as defined in claim 13, wherein:
the first change mechanism and the second change mechanism include a common shaft that is operably coupled to the manipulation member and that is pivotable in response to the manipulation of the manipulation member,
the first change mechanism includes a first change part that is on the common shaft and that is configured to selectively enable and disable the biasing by the first biasing member in response to pivoting of the common shaft, and
the second change mechanism includes a second change part that is on the common shaft and that is configured to selectively change the action of the orbital mechanism in response to the pivoting of the common shaft.

15. The reciprocating tool as defined in claim 14, wherein:
the manipulation member is pivotable between at least a first pivot position, a second pivot position and a third pivot position,
the first change part is configured (i) to enable the biasing by the biasing member when the manipulation member is at the first pivot position, (ii) to disable the biasing by the biasing member when the manipulation member is at the second pivot position, and (iii) to disable the biasing by the biasing member when the manipulation member is at the third pivot position, and
the second change part is configured to change the action of the orbital mechanism such that at least the action when the manipulation member is at the second pivot position is different from the action when the manipulation member is at the third pivot position.

16. The reciprocating tool as defined in claim 15, further comprising:
a blocking member between the support body and the first biasing member,
wherein:
the first change part is configured as a first cam part,
the second change part is configured as a second cam part,
the driving mechanism includes a crank plate that is below a rear end portion of the support body and that is configured to be rotationally driven around a rotational axis extending in the up-down direction by the power of the motor, the crank plate having a crank pin that is fixed at a position eccentric to the rotational axis and that is operably coupled to the slider,
the orbital mechanism includes:
a third cam part that is configured as an annular protrusion on the crank plate, the third cam part protruding upward from an upper surface of the crank plate such that the thickness of the third cam part in the up-down direction varies along a circumferential direction around the rotational axis; and
a second biasing member that is configured to bias the rear end portion of the support body in a direction in which the rear end portion of the support body abuts on the third cam part,
the first cam part is configured (i) to release the blocking member from a blocking position where the blocking member blocks the biasing force of the first biasing member when the manipulation member is at the first pivot position, (ii) to abut the blocking member to hold the blocking member at the blocking position when the manipulation member is at the second pivot position, and (iii) to abut the blocking member to hold the blocking member at the blocking position when the manipulation member is at the third pivot position,
the second cam part is configured (i) to abut the support body in at least a portion of a process in which the crank plate makes one rotation so as to prevent the rear end portion of the support body from abutting on the third cam part when the manipulation member is at the second pivot position and (ii) to allow the rear end portion of the support body to abut on the third cam part in the entirety of the process in which the crank plate makes one rotation when the manipulation member is at the third pivot position.

17. The reciprocating tool as defined in claim 9, further comprising:
an abutment part that is configured to abut the support body or the slider to define an amount by which the slider moves in a second direction that is opposite to a biasing direction of the first biasing member.

18. The reciprocating tool as defined in claim 9, wherein the first biasing member is below a rear end portion of the support body and biases the rear end portion upward.

19. A reciprocating tool comprising:
a housing having a first axis that defines a front-rear direction of the reciprocating tool;
a support body supported within the housing;
a slider (i) supported by the support body to be linearly movable relative to the support body and (ii) having a front end portion configured to removably receive a blade having a cutting edge;
a motor;
a driving mechanism operably coupled to the slider and configured to reciprocally move the slider relative to the support body using power of the motor;
a first biasing member configured to selectively bias the slider;
a manipulation member;
a first change mechanism operably coupled to the manipulation member and configured to selectively enable and disable the first biasing member to bias the slider in response to manipulation of the manipulation member;
an orbital mechanism that is configured to selectively generate an orbital motion of the blade by causing the slider to oscillate in the up-down direction while the driving mechanism reciprocally moves the slider; and
a second change mechanism that is operably coupled to the manipulation member and that is configured to selectively change action of the orbital mechanism in response to the manipulation of the manipulation member,
wherein:
in an up-down direction that is orthogonal to the first axis, a direction to which the cutting edge of the blade is directed in normal use of the reciprocating tool defines a downward direction, and
when biasing of the slider by the first biasing member is enabled by the first change mechanism, the first biasing member biases the slider downward.

20. The reciprocating tool as defined in claim 19, wherein the first biasing member is below a rear end portion of the slider and biases the rear end portion upward.

21. The reciprocating tool as defined in claim 20, wherein the reciprocating tool is configured such that the slider oscillates relative to the housing in the up-down direction when the biasing of the slider is enabled.

22. The reciprocating tool as defined in claim 19, wherein:
the first change mechanism and the second change mechanism include a common shaft that is operably coupled to the manipulation member and that is pivotable in response to the manipulation of the manipulation member,
the first change mechanism includes a first change part that is on the common shaft and that is configured to selectively enable and disable the biasing by the first biasing member in response to pivoting of the common shaft, and
the second change mechanism includes a second change part that is on the common shaft and that is configured to selectively change the action of the orbital mechanism in response to the pivoting of the common shaft.

23. The reciprocating tool as defined in claim 22, wherein:
the manipulation member is pivotable between at least a first pivot position, a second pivot position and a third pivot position,
the first change part is configured (i) to enable the biasing by the biasing member when the manipulation member is at the first pivot position, (ii) to disable the biasing by the biasing member when the manipulation member is at the second pivot position, and (iii) to disable the biasing by the biasing member when the manipulation member is at the third pivot position, and
the second change part is configured to change the action of the orbital mechanism such that at least the action when the manipulation member is at the second pivot position is different from the action when the manipulation member is at the third pivot position.

24. The reciprocating tool as defined in claim 23, further comprising:
a blocking member between the support body and the first biasing member,
wherein:
the first change part is configured as a first cam part,
the second change part is configured as a second cam part,
the driving mechanism includes a crank plate that is below a rear end portion of the support body and that is configured to be rotationally driven around a rotational axis extending in the up-down direction by the power of the motor, the crank plate having a crank pin that is fixed at a position eccentric to the rotational axis and that is operably coupled to the slider,
the orbital mechanism includes:
a third cam part that is configured as an annular protrusion on the crank plate, the third cam part protruding upward from an upper surface of the crank plate such that the thickness of the third cam part in the up-down direction varies along a circumferential direction around the rotational axis; and
a second biasing member that is configured to bias the rear end portion of the support body in a direction in which the rear end portion of the support body abuts on the third cam part,
the first cam part is configured (i) to release the blocking member from a blocking position where the blocking member blocks the biasing force of the first biasing member when the manipulation member is at the first pivot position, (ii) to abut the blocking member to hold the blocking member at the blocking position when the manipulation member is at the second pivot position, and (iii) to abut the blocking member to hold the blocking member at the blocking position when the manipulation member is at the third pivot position,
the second cam part is configured (i) to abut the support body in at least a portion of a process in which the crank plate makes one rotation so as to prevent the rear end portion of the support body from abutting on the third cam part when the manipulation member is at the second pivot position and (ii) to allow the rear end portion of the support body to abut on the third cam part in the entirety of the process in which the crank plate makes one rotation when the manipulation member is at the third pivot position.

\* \* \* \* \*